(12) United States Patent
Demirors et al.

(10) Patent No.: US 8,691,923 B2
(45) Date of Patent: Apr. 8, 2014

(54) INTERCONNECTED COPOLYMERS OF ETHYLENE IN COMBINATION WITH AT LEAST ONE POLYSILOXANE

(75) Inventors: Mehmet Demirors, Pearland, TX (US); Teresa P. Karjala, Lake Jackson, TX (US); John O. Osby, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 80 days.

(21) Appl. No.: 13/394,675

(22) PCT Filed: Sep. 14, 2010

(86) PCT No.: PCT/US2010/048818
§ 371 (c)(1),
(2), (4) Date: Mar. 7, 2012

(87) PCT Pub. No.: WO2011/032172
PCT Pub. Date: Mar. 17, 2011

(65) Prior Publication Data
US 2012/0172545 A1    Jul. 5, 2012

Related U.S. Application Data

(60) Provisional application No. 61/242,127, filed on Sep. 14, 2009.

(51) Int. Cl.
*C08F 283/12* (2006.01)
*C08J 5/18* (2006.01)

(52) U.S. Cl.
USPC .......................................................... 525/479

(58) Field of Classification Search
USPC .......................................................... 525/479
See application file for complete search history.

(56) References Cited

U.S. PATENT DOCUMENTS

| | | |
|---|---|---|
| 3,485,706 A | 12/1969 | May |
| 3,663,649 A | 5/1972 | Wheeler |
| 3,726,842 A | 4/1973 | Gropper et al. |
| 4,178,951 A | 12/1979 | Sweeney |
| 4,322,027 A | 3/1982 | Reba |
| 4,340,563 A | 7/1982 | Appel et al. |
| 4,413,110 A | 11/1983 | Kavesh et al. |
| 4,544,762 A | 10/1985 | Kaminsky et al. |
| 4,599,392 A | 7/1986 | McKinney et al. |
| 4,663,220 A | 5/1987 | Wisneski et al. |
| 4,668,566 A | 5/1987 | Braun |
| 5,015,749 A | 5/1991 | Schmidt et al. |
| 5,041,584 A | 8/1991 | Crapo et al. |
| 5,041,585 A | 8/1991 | Deavenport et al. |
| 5,272,236 A | 12/1993 | Lai et al. |
| 5,278,272 A | 1/1994 | Lai et al. |
| 5,430,120 A * | 7/1995 | Ohara et al. .................. 528/25 |
| 5,542,199 A | 8/1996 | Dreisbach et al. |
| 5,844,045 A | 12/1998 | Kolthammer et al. |
| 5,869,575 A | 2/1999 | Kolthammer et al. |
| 6,054,544 A | 4/2000 | Finlayson et al. |
| 6,090,376 A | 7/2000 | Dubief et al. |
| 6,239,244 B1 | 5/2001 | Stepp et al. |
| 6,335,410 B1 | 1/2002 | Finlayson et al. |
| 6,448,341 B1 | 9/2002 | Kolthammer et al. |
| 6,538,070 B1 | 3/2003 | Cardwell et al. |
| 6,545,088 B1 | 4/2003 | Kolthammer et al. |
| 6,566,446 B1 | 5/2003 | Parikh et al. |
| 6,723,810 B2 | 4/2004 | Finlayson et al. |
| 6,797,779 B1 | 9/2004 | Ajbani et al. |
| 2006/0252094 A1 | 11/2006 | Zhou et al. |
| 2007/0167578 A1 | 7/2007 | Arriola et al. |
| 2010/0168330 A1 | 7/2010 | Demirors et al. |
| 2010/0317804 A1 | 12/2010 | Karjala et al. |
| 2011/0021713 A1 | 1/2011 | Demirors et al. |
| 2011/0130533 A1 | 6/2011 | Karjala et al. |
| 2011/0196105 A1 | 8/2011 | Eddy et al. |

FOREIGN PATENT DOCUMENTS

| | | |
|---|---|---|
| EP | 0217585 | 4/1987 |
| GB | 1209503 | 10/1970 |
| JP | 2252782 | 10/1990 |
| JP | 4091217 | 3/1992 |
| JP | 2001080299 | 3/2001 |
| WO | 9829508 | 7/1998 |
| WO | 0192357 | 12/2001 |
| WO | 03091262 | 11/2003 |
| WO | 2005021622 | 3/2005 |
| WO | 2007136495 | 11/2007 |
| WO | 2007136496 | 11/2007 |
| WO | 2007136497 | 11/2007 |
| WO | 2007136506 | 11/2007 |
| WO | 2010141557 | 12/2010 |
| WO | 2010144784 | 12/2010 |
| WO | 2011019563 | 2/2011 |

OTHER PUBLICATIONS

Anklam et al (Electric Field induced Rupture of polymer stablizied oil films, Colloid Polymer Science 277:957-964 Oct. 1999).*
Ciolino, A.E. et al "Novel synthesis of polyethylene-poly(dimethylsiloxane) copolymers with metallocene catalyst" Journal of Polymer Science Part A: Polymer Chermistry vol. 42, No. 10 Apr. 8, 2004 p. 2462-2473.
Zimm B.H, J. Chem. Phys., 16, 1099 (1948).
Mohajery P., "Synthesis and properties of poly(ethylene oxide)-grafted polyethylene copolymer and terpolymer" Polymers for Advanced Technoloies, vol. 21. No. 1 Feb. 23, 2009.
Neugebauer D., Graft copolymers with poly(ethylene oxide) segments, Polymer Internaional vol. 56 No. 12 Aug. 8, 2007.
Yau, W.W., "Examples of Using 3D-GPC-TREF for Polyolefin Characterization" Macromol Symp. 2007, 257, 29-45.

* cited by examiner

*Primary Examiner* — Randy Gulakowski
*Assistant Examiner* — Christopher M Rodd
(74) *Attorney, Agent, or Firm* — Whyte Hirschboeck Dudek S.C.

(57) ABSTRACT

The invention provides a polymer comprising units derived from ethylene and siloxane, polymer having at least 0.15 units of amyl groups per 1000 carbon atoms as determined by $^{13}C$ Nuclear Magnetic Resonance (NMR).

15 Claims, 6 Drawing Sheets

Relationship of Peak Melting Temperature Tm and Density of Commercially Available LDPE and Three Inventive Polymers

$^{13}$C NMR Spectrum of LDPE (C-3) Showing Location of Peaks Characteristic of Different Branch Types

$^{13}$C NMR Spectrum of LDPE Showing an Example of Quantification of C5 Branches/1000C

$^{13}$C NMR Spectrum of LDPE Containing C1 Branches

$^{13}$C NMR Spectrum of a HDPE Containing C3 (Propyl) Branches from a Pentene Comonomer

LDPE-PDMS Showing Integrals used to Quantify the PDMS and LDPE for the Extracted Version of Example 3

Overlay of 13C NMR Spectra of Three PDMS Grafted LDPE

Overlay of 13C NMR Spectra of Three PDMS Grafted LDPEs, Scaled to Show Relative Intensities of the PDMS Peaks

Heat of Fusion vs. Density Plot

INTERCONNECTED COPOLYMERS OF ETHYLENE IN COMBINATION WITH AT LEAST ONE POLYSILOXANE

CROSS-REFERENCE TO RELATED APPLICATIONS

The present application claims the benefit of U.S. Provisional Application No. 61/242,127, filed on Sep. 14, 2009, and fully incorporated herein by reference.

BACKGROUND

Conventional low density polyethylene (LDPE) has good processability, however when used in film applications slip additives are typically required to impart a low coefficient of friction (COF). Unfortunately for many LDPE compositions such additives migrate and leach out over time. Moreover, the COF of a film is temperature dependent and this, in turn, can lead to inconsistent film properties. Accordingly, a need exists for LDPE compositions with good processability and that can be used to form films with consistent COF behavior.

SUMMARY OF THE INVENTION

In one embodiment, the invention is a polymer comprising units derived from ethylene and siloxane, the polymer having at least 0.15 units of amyl groups per 1000 carbon atoms as determined by $^{13}$C Nuclear Magnetic Resonance (NMR). The polymer comprises a siloxane, typically a polysiloxane, with ethylene-based polymeric branches. The measure of 0.15 amyl groups per 1000 carbon atoms is based on the number of carbon atoms in the ethylene-based polymeric branches exclusive of the carbon atoms that form a part of the siloxane.

In one embodiment, the invention is a process to form a polymer comprising units derived from ethylene and siloxane, the process comprising:
A. Contacting at least one siloxane with ethylene in the presence of a free-radical initiator in a first reactor or a first part of a multi-part reactor; and
B. Reacting the siloxane with additional ethylene in the presence of the free-radical initiator to form an ethylene-based polymeric branch bonded to the siloxane in at least one other reactor or a later part of the multi-part reactor.

DETAILED DESCRIPTION

Figure 1:
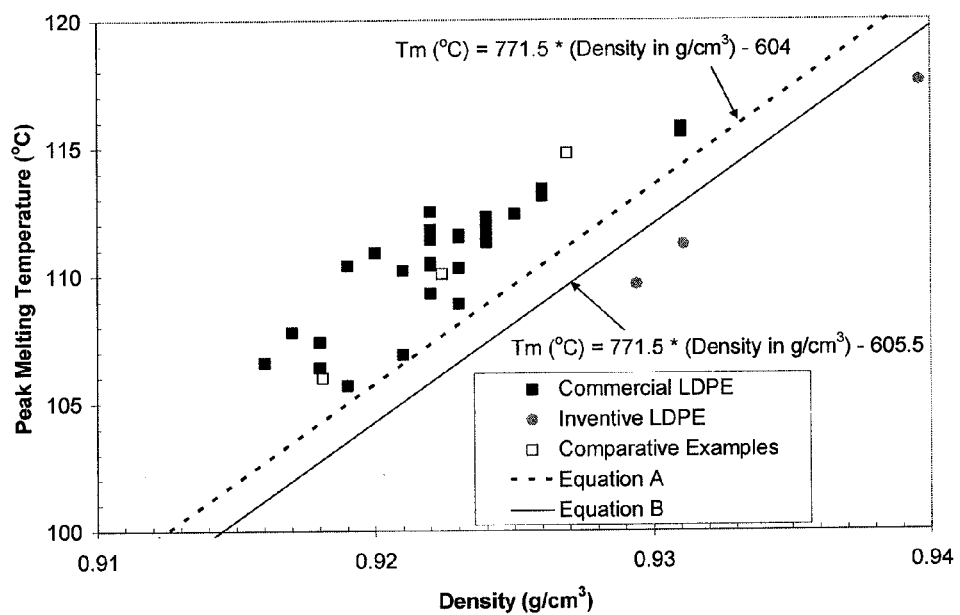
FIG. 1 is a plot reporting the relationship of peak melting temperature (Tm) and density of commercially available LDPE and three inventive polymers using two mathematical relationships.

The following discussion is presented to enable a person skilled in the art to make and use the disclosed compositions and methods. The general principles described may be applied to embodiments and applications other than those detailed without departing from the spirit and scope of the disclosed compositions and methods. The disclosed compositions and methods are not intended to be limited to the embodiments shown, but is to be accorded the widest scope consistent with the principles and features disclosed.

Inventive Polymer

Currently, when a high crystallinity, polysiloxane is used with a low crystallinity, highly branched ethylene-based polymer, e.g., a high pressure low density ethylene-based polymer (for example a low density polyethylene (LDPE)), there is no mechanical means to create a blend that faithfully combines all the physical performance advantages of the polysiloxane with the all the favorable processing characteristics of the highly branched ethylene-based polymer. Disclosed are polymers, compositions and methods that address this shortcoming. A benefit of the disclosed polymers, compositions and methods is the ability to produce resins with a higher polymer density using conventional processes that have the processibility of a highly branched ethylene-based polymer in conjunction with the physical properties akin to the physical properties associated with the polysiloxane.

The term "ethylene-based polymeric branch" refers to a polymeric unit comprising polymerized ethylene and which is bonded to a siloxane, preferably at a silicon or carbon atom. In one embodiment the inventive polymer (sometimes referred to as "ethylenic polymer") comprises the structural formula of Formula 1.

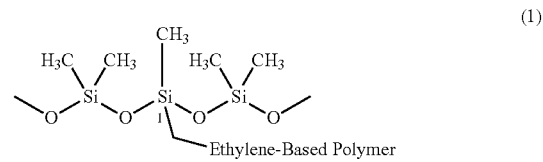

In Formula 1 the ethylene-based polymeric branch can be a homopolymer, e.g., LDPE, or an interpolymer, such as an ethylene-propylene copolymer branch. The polymer comprises a siloxane unit (here derived from polydimethylsiloxane or PDMS) with an ethylene-based polymeric branch covalently attached at silicon atom 1. The ethylene-based polymeric branch is either formed directly on the siloxane, i.e., an ethylene monomer or oligomer attaches at the siloxane and is subsequently polymerized or further polymerized with other ethylene monomers (or copolymerized with one or more olefin comonomers) to form the ethylene-based polymeric branch, or an ethylene-based polymer is formed independently and subsequently grafted to the siloxane. The siloxane can contain one or more ethylene-based polymeric branches, the number of branches on any siloxane is a function, at least in part, of the size of the siloxane and the conditions under which the ethylene is polymerized or the polyethylene is grafted to the siloxane. The ethylene-based polymeric branches can vary in size and structure, but typically and preferably comprise one or more long chain branches (LCB, which are characteristic of high pressure LDPE). If the ethylene-based polymer from which the ethylene-based polymeric branches are derived is made by a high pressure process and/or contains long chain branching, then sometimes this polymer, or branches derived from this polymer, is known as a highly branched ethylene-based polymer.

The covalent bonding of the two constituents—a siloxane (the term includes polysiloxanes and lower molecular weight siloxanes) and a highly branched ethylene-based polymer—results in a polymer with physical properties akin to or better than the polysiloxane component while maintaining processability characteristics akin to the highly branched ethylene-based polymer component.

The combination of physical and processing properties for the disclosed polymers of this invention is not observed in mere blends of polysiloxanes with highly branched ethylene-based polymers. The unique chemical structure of the disclosed polymers of this invention is advantageous as the polysiloxane and the highly branched ethylene-based polymer substituent are covalently linked. When bonded, the two different crystallinity materials produce a polymer different than a mere blend of the constituents. This combination of two different sets of branching and crystallinity materials results in a polymer with physical properties that are better than the highly branched ethylene-based polymer and better processibility than the polysiloxane.

The polymer of this invention may comprise unreacted siloxane. The polymer of this invention may also comprise free or unattached ethylene-based polymer that formed or was introduced into the process of making the inventive polymer but did not bond with the siloxane. These siloxanes that are not bond to an ethylene-based polymer and these ethylene-based polymers that are not bonded to a siloxane are usually present at low levels, or can be removed to low levels, through various purification or recovery methods known to those skilled in the art.

In one embodiment the polymer comprises units derived from ethylene and siloxane, the polymer having at least 0.15, typically at least 0.5 and more typically at least 0.8 units, of amyl groups per 1000 carbon atoms as determined by $^{13}$C Nuclear Magnetic Resonance (NMR). Typically the polymer has one or more of: (1) one, typically at least 1.2 and more typically at least 1.4, units of C6+ branches per 1000 carbon atoms as determined by $^{13}$C NMR, (2) no appreciable methyl branches per 1000 carbon atoms as determined by $^{13}$C NMR; (3) no appreciable propyl branches per 1000 carbon atoms as determined by $^{13}$C NMR, and (4) no greater than 5, typically no greater than 3.0 and more typically no greater than 2.0, units of amyl groups per 1000 carbon atoms as determined by $^{13}$C NMR. In one embodiment the polymer, or the ethylene-based polymeric branches of the polymer, has two, three or all four of these properties.

In one embodiment the polymer has a density greater than 0.91, or 0.92, or 0.93, or 0.94, grams per cubic centimeter (g/cc or g/cm$^3$) as measured by ASTM D 792. In one embodiment the polymer has a density of 0.91 to 0.96, or 0.91 to 0.95 or 0.91 to 0.94, g/cc. The densities of polymers of this invention are usually greater than the densities of their ethylene-based polymer equivalents, i.e., the densities of the ethylene-based polymeric branches not attached to a siloxane, and this greater density allows for the manufacture of lower gauge film with similar properties of a higher gauge film made with the ethylene-based polymer equivalent.

In one embodiment the polymer has a melt index of 0.01 to 1000, typically of 0.05 to 100 and more typically of 0.1 to 50, grams per 10 minutes (g/10 min) as measured by ASTM 1238-04 (2.16 kg/190° C.).

In one embodiment the polymer has a peak melting temperature Tm in ° C. and density in g/cm$^3$ that satisfies the mathematical relationship:

$$Tm < 771.5 (° C. \cdot cc/g)(density) - 604 (° C.).\qquad (Eq.\ 1A)$$

In one embodiment the polymer has a peak melting temperature Tm in ° C. and density in g/cm$^3$ that satisfies the mathematical relationship:

$$Tm < 771.5 (° C. \cdot cc/g)(density) - 605.5 (° C.).\qquad (Eq.\ 1B)$$

These relationships are illustrated in FIG. 1 for Samples 1-3 reported in the Experimental section and the commercially available resins (CAR) reported in Table 1. In one embodiment Tm is less than 130, typically less than 120 and even more typically less than 115, ° C.

In one embodiment the polymer has a heat of fusion (H$_f$) in Joules/grams (J/g) and density in g/cm$^3$ that satisfies the mathematical relationship:

$$H_f < 2333\ (J \cdot cc/g^2) \times (density) - 2009\ (J/g).\qquad (Eq.\ 1C)$$

In one embodiment the polymer has a heat of fusion (H$_f$) in Joules/grams (J/g) and density in g/cm$^3$ that satisfies the mathematical relationship:

$$H_f < 2333\ (J \cdot cc/g^2) \times (density) - 2020\ (J/g).\qquad (Eq.\ 1D)$$

Figure 9:
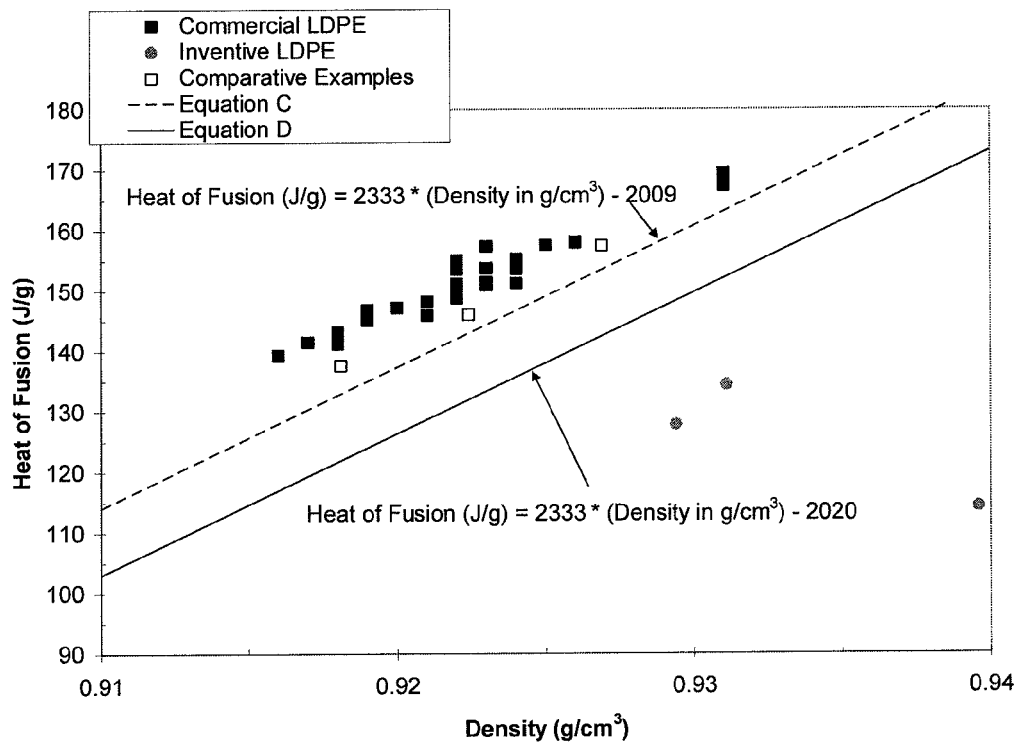
FIG. 9 is a plot reporting the relationship of peak heat of fusion ($H_f$) and density of commercially available LDPE and three inventive polymers using two mathematical relationships.

These relationships are illustrated in FIG. 9 for Samples 1-3 reported in the Experimental section and the commercially available resins (CAR) reported in Table 1.

In one embodiment less than 40, or less than 30, or less than 20, or less than 20, or less than 10, weight percent of the siloxane used in the process to make the inventive polymer is extractable by solvent extraction from the polymer.

In one embodiment, the invention is a composition comprising a polymer comprising units derived from ethylene and siloxane, the polymer having at least 0.15 units of amyl groups per 1000 carbon atoms as determined by $^{13}$C NMR. In one embodiment, the invention is an article comprising such a composition, and in one embodiment the invention is an article comprising a component comprising such a composition. In one embodiment the article is a film.

In one embodiment the polymer comprises a majority weight percent of polymerized ethylene based on the weight of the polymer.

Siloxane

The siloxane can be any of a diverse class of polymers manufactured as fluids, resins, or elastomers. As illustrated in Formula 2, they are partially organic compounds, but, unlike most polymers, they have a backbone containing no carbon, composed instead of alternating silicon and oxygen atoms.

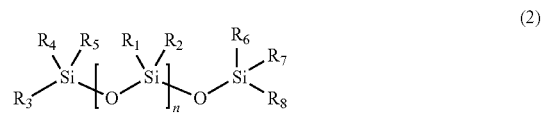

(2)

Each $R_1$-$R_8$ is individually an alkyl, vinyl, phenyl, hydrogen, hydroxyl, acetoxy, enoxy, oxime, methoxy, ethoxy, alcoxy, dimethylamino, aminopropyl, hydroxypropyl, mercaptopropyl, chloropropyl, acryloxypropyl, methacryloxypropyl, epoxypropoxypropyl or epoxycyclohexylethyl. Preferably each $R_1$-$R_8$ is individually a $C_1$ to $C_{18}$ alkyl, $C_3$ to $C_6$ cycloalkyl, vinyl, phenyl, hydrogen or hydroxyl. Most preferably each $R_1$-$R_8$ is individually methyl, vinyl, hydrogen or hydroxyl. In one embodiment each $R_1$-$R_8$ is methyl.

The simplest version possible is where n is zero (in formula 2, hexamethyl disiloxane) but typically and preferably n is sufficiently large such that the polysiloxane has a viscosity of 100 or more, preferably 200 or more and even more preferably 500 or more, centistokes (CST). Typically n is no larger than would produce a polysiloxane with a viscosity no greater than 2.5 million CST. Lower upper limits on viscosity, e.g., 1 million or 600,000 CST, are within the range of this invention but higher molecular weights are typically preferred. The method for measuring the viscosity of the siloxane is described infra.

In most silicones two organic groups, usually methyl or phenyl, are attached to each silicon atom. Silicones in general are exceptionally stable and inert. Silicone fluids are used in hydraulic fluids, emulsion-breaking compositions, and breast implants and as adhesives, lubricants, water repellents, and protective coatings. Silicone rubbers are used as electrical insulators in encapsulations, coatings, and varnishes; as gaskets and caulking material; in specialized tubing; as automobile engine components; as flexible windows in face masks and air locks; for laminating glass cloth; and as surgical membranes and implants.

Siloxanes useful in the present invention include those taught in U.S. Pat. No. 6,239,244. The siloxanes are typically polysiloxanes, and are commercially available commercially from a number of different manufacturers including, but not limited to, Dow Corning, Momentive, Wacker, Shin-Etsu and Evonik. One representative siloxane is Dow Corning 200 Fluid.

Ethylene-Based Polymeric Branches

As noted above, the ethylene-based polymeric branches attached to the siloxane can be either generated directly on the siloxane or formed apart from the siloxane and subsequently grafted to the siloxane. The embodiment in which the ethylene-based polymeric branches are formed directly on the siloxane is described in the process description infra, and it is the process of choice.

In the embodiment in which the ethylene-based polymeric branch is grafted to the siloxane, the branch is derived from an ethylene-based polymer that can be either a homopolymer of ethylene or an interpolymer in which the polymer comprises a majority of units (in mole percent) derived from ethylene with a minority of units (in mole percent) derived from one or more other olefins. Typically and preferably the polymer is a homopolymer of ethylene, particularly a high pressure, low density polyethylene (HPLDPE). These polymers are made in a high-pressure process using free-radical chemistry to polymerize ethylene monomer. Typical polymer density is from about 0.91 to about 0.94 grams per cubic centimeter (g/cm$^3$). The low density polyethylene may have a melt index ($I_2$) from about 0.01 to about 150 g/10 min. Highly branched ethylene-based polymers such as LDPE may also be referred to as "high pressure ethylene polymers", meaning that the polymer is partly or entirely homopolymerized or copolymerized in autoclave or tubular reactors at pressures above 13,000 pounds per square inch gauge (psig) with the use of free-radical initiators, such as peroxides (see, for example, U.S. Pat. No. 4,599,392 (McKinney, et al.)). The process creates a polymer with significant branches, including long chain branches, out of the monomer/comonomer material.

As noted supra, comonomers that may be used in forming the ethylene-based polymer from which the branch is derived include, but are not limited to, α-olefin comonomers, typically having no more than 20 carbon atoms. For example, the α-olefin comonomers may have 3 to 10 carbon atoms; or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In the alternative, exemplary comonomers include, but are not limited to α,β-unsaturated $C_3$-$C_8$-carboxylic acids, in particular maleic acid, fumaric acid, itaconic acid, acrylic acid, methacrylic acid and crotonic acid derivates of the α,β-unsaturated $C_3$-$C_8$-carboxylic acids, for example unsaturated $C_3$-$C_{15}$-carboxylic acid esters, in particular ester of $C_1$-$C_6$-alkanols, or anhydrides, in particular methyl methacrylate, ethyl methacrylate, n-butyl methacrylate, ter-butyl methacrylate, methyl acrylate, ethyl acrylate n-butyl acrylate, 2-ethylhexyl acrylate, tert-butyl acrylate, methacrylic anhydride, maleic anhydride, and itaconic anhydride. In another alternative, the exemplary comonomers include, but are not limited to, vinyl carboxylates, for example vinyl acetate. In another alternative, exemplary comonomers include, but are not limited to, n-butyl acrylate, acrylic acid and methacrylic acid.

Process

The siloxane, typically and preferably a polysiloxane, may be produced before or separately from the reaction process with the ethylene-based polymer. In other disclosed processes, the polysiloxane may be formed in situ and in the presence of an ethylene-based polymer within a well-stirred reactor such as a tubular reactor or an autoclave reactor.

The ethylene-based polymer is formed in the presence of ethylene. In one embodiment the polymer of this invention is formed by free radical grafting of ethylene-based polymer molecules onto a radicalized polysiloxane molecule. In one embodiment the ethylene-based polymeric branch is formed by free-radical ethylene polymerization from a radicalized polysiloxane site. Other embodiment processes for formation of the polysiloxane, the substituent ethylene-base polymeric branch, and their combination into the disclosed polymer, may exist.

In one embodiment the ethylene-based polymer from which the branch is derived and the polysiloxane are prepared externally to the reaction process used to form the polymer of this invention, are combined in a common reactor in the presence of ethylene under free-radical polymerization conditions, and the two polymers are subjected to process conditions and reactants to effect the formation of the inventive polymer.

In one embodiment the ethylene-based polymer from which the branches are derived and the polysiloxane are both prepared in different forward parts of the same process and are then combined together in a common downstream part of the process in the presence of ethylene under free-radical polymerization conditions. The polysiloxane and the substituent ethylene-based polymer are made in separate forward reaction areas or zones, such as separate autoclaves or an upstream part of a tubular reactor. The products from these forward reaction areas or zones are then transported to and combined in a downstream reaction area or zone in the presence of ethylene under free-radical polymerization conditions to facilitate the formation of a polymer of this invention. In some processes free radical generating compounds are added to the downstream reaction area or zone to facilitate the reaction. In some processes a catalyst is added to facilitate reactions in the downstream reaction area or zone. In some processes additional fresh ethylene is added to the process downstream of the forward reaction areas or zones to facilitate both the formation of and grafting of ethylene-based polymeric branches to the polysiloxane and the reaction of ethylene monomer directly with the polysiloxane to form the inventive polymer. In some processes at least one of the product streams from the forward reaction areas or zones is treated before reaching the downstream reaction area or zone to neutralize any residue or byproducts that may inhibit the downstream reactions.

In one in situ embodiment the polysiloxane is created in a first or forward reaction area or zone, such as a first autoclave or an upstream part of a tubular reactor. The resultant product stream is then transported to a downstream reaction area or zone where the there is a presence of ethylene at free-radical polymerization conditions. These conditions support both the formation of and grafting of an ethylene-based polymer to the polysiloxane as well as the reaction of ethylene monomer directly with at least one radicalized site on the polysiloxane, thereby forming an inventive polymer. In some processes free radical generating compounds are added to the downstream reaction area or zone to facilitate the grafting reaction. In some processes a catalyst is added to facilitate grafting and reactions in the downstream reaction area or zone. In some processes additional fresh ethylene is added to the process downstream of the forward reaction areas or zones to facilitate both the formation and grafting of highly branched ethylene-based polymer to and the reaction of ethylene monomer with the polysiloxane to form the disclosed ethylenic polymer. In some processes the product stream from the forward reaction area or zone is treated before reaching the downstream reaction area or zone to neutralize any residue or byproducts from the previous reaction that may inhibit the ethylene-based polymer formation, the grafting of ethylene-based polymer to the polysiloxane, or the reaction of ethylene monomer with the polysiloxane to form the inventive polymer.

For producing a highly branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), preferably from 1000 to 2000 m. The beginning of a reaction zone for either type of reactor is defined by the side injection of either initiator of the reaction, ethylene, telomer, comonomer(s) as well as any combination thereof. A high pressure process can be carried out in autoclave or tubular reactors having at least 2 reaction zones or in a combination of autoclave and tubular reactors, each comprising one or more reaction zones.

In one embodiment the catalyst or initiator is injected prior to the reaction zone where free radical polymerization is to be induced. In one embodiment the polysiloxane may be fed into the reaction system at the front of the reactor system and not formed within the system itself. Termination of catalyst activity may be achieved by a combination of high reactor temperatures for the free radical polymerization portion of the reaction or by feeding initiator into the reactor dissolved in a mixture of a polar solvent such as isopropanol, water, or conventional initiator solvents such as branched or unbranched alkanes.

In one embodiment the process may include a process recycle loop to improve conversion efficiency. In such an embodiment the downstream reaction area or zone may be maintained at a temperature which is lower than that at which the highly branched ethylene-based polymer would phase separate from the polysiloxane. It is preferred that the reactor in which the copolymerization takes place be a reactor with a high polymer ("solids") concentration, such as a loop reactor, to maximize the concentration of polymerizable highly branched ethylene-based polymer in the reactor. In one embodiment the recycle loop may be treated to neutralize residues or byproducts from the previous reaction cycle that may inhibit polymerization of either the polysiloxane or the highly branched ethylene-based polymer or inhibit the reaction forming the disclosed ethylenic polymer. In one embodiment fresh monomer is added to this stream.

Ethylene used for the production of ethylene-based polymer may be purified ethylene, which is obtained by removing polar components from a loop recycle stream or by using a reaction system configuration such that only fresh ethylene is used for making the polysiloxanes. It is not typical that purified ethylene is required to make ethylene-based polymer. In such cases ethylene from the recycle loop may be used.

Processes may be used for either the homopolymerization of ethylene in the presence of a polysiloxane or copolymerization of ethylene with one or more other comonomers in the presence of a polysiloxane, provided that these comonomers are copolymerizable with ethylene under free-radical conditions, preferably under high pressure conditions to form highly branched ethylene-based polymers.

Chain transfer agents or telogens (CTA) are typically used to control the melt index in a free-radical polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. For high pressure free radical polymerization, these agents can be of many different types, such as saturated hydrocarbons, unsaturated hydrocarbons, aldehydes, ketones or alcohols. Typical CTA that can be used include, but are not limited to, propylene, isobutane, n-butane, 1-butene, methyl ethyl ketone, propionaldehyde, ISOPAR (ExxonMobil Chemical Co.), and isopropanol. The amount of CTA used in the process is 0.03 to 10 weight percent of the total reaction mixture.

The melt index (MI or $I_2$) of a polymer, which is inversely related to the molecular weight, is controlled by manipulating the concentration of the chain transfer agent. For free radical polymerization, after the donation of a hydrogen atom, the CTA forms a radical which can react with the monomers, or with an already formed oligomers or polymers, to start a new polymer chain. This means that any functional groups present in the chain transfer agents will be introduced in the polymer chains. A large number of CTA, for example, propylene and 1-butene which have an olefinically unsaturated bond, may also be incorporated in the polymer chain themselves, via a copolymerization reaction. Polymers produced in the presence of chain transfer agents are modified in a number of physical properties such as processability, optical properties such as haze and clarity, density, stiffness, yield point, film draw and tear strength.

Hydrogen has been shown to be a chain transfer agent for high pressure free radical polymerization. Control of the molecular weight made in the reaction zones for disclosed processes may be accomplished by feeding hydrogen to the reaction zones where catalyst or initiator is injected. The final product melt index control would be accomplished by feeding chain transfer agents to the reaction zones where free radical polymerization takes place. Feed of the free radical chain transfer agents could be accomplished by direct injection into the reaction zones or by feeding them to the front of the reactor. If hydrogen is fed to the front of the reactor, it would not be expected to act as a chain transfer agent until entering reaction zones where initiator is injected, at which point the unsaturated chain transfer agents would be expected to interact with growing polymer chains. In some embodiment processes, it may be necessary to remove excess CTA from the recycle stream or limit injection so as to prevent excess buildup of CTA in the front end of the process.

The type of free radical initiator used in the processes of this invention is not critical. Free radical initiators that are generally used to produce ethylene-based polymers are oxygen, which is usable in tubular reactors in conventional amounts of between 0.0001 and 0.005 weight percent (wt %) based upon the weight of polymerizable monomer, and peroxides. Preferred initiators are t-butyl peroxy pivalate, di-t-butyl peroxide, t-butyl peroxy acetate and t-butyl peroxy-2-hexanoate or mixtures thereof. These organic peroxy initiators are used in conventional amounts of between 0.005 and 0.2 wt % based upon the weight of polymerizable monomers.

The peroxide initiator may be, for example, organic peroxide. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals.

Exemplary cyclic peroxides include, but are not limited to, 3,6,9-triethyl-3,6,9-trimethyl-1,4,7-triperoxonane. Such cyclic peroxides, for example, are commercially available under the trade name TRIGONOX 301 (Akzo Nobel; Arnhem, The Netherlands). Exemplary diacyl peroxides include, but are not limited to, di(3,5,5-trimethylhexanoyl) peroxide. Such diacyl peroxides, for example, are commercially available under the trade name TRIGONOX 36 (Akzo Nobel). Exemplary dialkyl peroxides include, but are not limited to, 2,5-dimethyl-2,5-di(tert-butylperoxy)hexane; 2,5-dimethyl-2,5-di(tert-butylperoxy)hexyne-3; di-tert-amyl peroxide; di-tert-butyl peroxide; and tert-butyl cumyl peroxide. Such dialkyl peroxides, for example, are commercially available under the trade names TRIGONOX 101, TRIGONOX 145, TRIGONOX 201, TRIGONOX B, and TRIGONOX T (Akzo Nobel). Exemplary hydroperoxides include, but are not limited to, tert-amyl hydroperoxide; and 1,1,3,3-tetramethylbutyl hydroperoxide. Such hydroperoxides, for example, are commercially available under the trade names TRIGONOX TAHP, and TRIGONOX TMBH (Akzo Nobel). Exemplary peroxycarbonates include, but are not limited to, tert-butylperoxy-2-ethylhexyl carbonate; tert-amylperoxy-2-ethylhexyl carbonate; and tert-butylperoxy isopropyl carbonate. Such peroxycarbonates, for example, are commercially available under the trade names TRIGONOX 117, TRIGONOX 131, and TRIGONOX BPIC (Akzo Nobel). Exemplary peroxydicarbonates include, but are not limited to, di(2-ethylhexyl) peroxydicarbonates; and di-sec-butyl peroxydicarbonates. Such peroxydicarbonates, for example, are commercially available under the trade name TRIGONOX EHP, and TRIGONOX SBP (Akzo Nobel). Exemplary peroxyesters include, but are not limited to, tert-amyl peroxy-2-ethylhexanoate; tert-amyl peroxyneodecanoate; tert-amyl peroxypivalate; tert-amyl peroxybenzoate; tert-amyl peroxyacetate; 2,5-dimethyl-2,5-di(2-ethylhexanoylperoxy)hexane; tert-butyl peroxy-2-ethylhexanoate; tert-butyl peroxyneodecanoate; tert-butyl peroxyneoheptanoate; tert-butyl peroxypivalate; tert-butyl peroxydiethylacetate; tert-butyl peroxyisobutyrate; 1,1,3,3-tetramethylbutyl peroxy-2-ethylhexanoate; 1,1,3,3-tetramethylbutyl peroxyneodecanoate; 1,1,3,3-tetramethylbutyl peroxypivalate; tert-butyl peroxy-3,5,5-trimethylhexanoate; cumyl peroxyneodecanoate; tert-butyl peroxybenzoate; and tert-butyl peroxyacetate. Such peroxyesters solvents, for example, are commercially available under the trade names TRIGONOX 121; TRIGONOX 123; TRIGONOX 125; TRIGONOX 127; TRIGONOX 133; TRIGONOX 141; TRIGONOX 21; TRIGONOX 23; TRIGONOX 257; TRIGONOX 25; TRIGONOX 27; TRIGONOX 41; TRIGONOX 421; TRIGONOX 423; TRIGONOX 425; TRIGONOX 42; TRIGONOX 99; TRIGONOX C; and TRIGONOX F (Akzo Nobel). Exemplary peroxyketals include, but are not limited to, 1,1-di(tert-amylperoxy)cyclohexane; 1,1-di(tert-butylperoxy)cyclohexane; 1,1-di (tert-butylperoxy)-3,3,5-trimethylcyclohexane; and 2,2-di (tert-butylperoxy)-butane. Such peroxyketals, for example, are commercially available under the trade names TRIGONOX 122, TRIGONOX 22, TRIGONOX 29, and TRIGONOX D (Akzo Nobel). The free radical initiator system may, for example, include a mixture or combination of any of the aforementioned peroxide initiators. The peroxide initiator may comprise less than 60 percent by weight the free radical initiator system.

The free radical initiator system further includes at least one hydrocarbon solvent. The hydrocarbon solvent may, for example, be a $C_5$ to $C_{30}$ hydrocarbon solvent. Exemplary hydrocarbon solvents include, but are not limited to, mineral solvents, normal paraffinic solvents, isoparaffinic solvents, cyclic solvents, and the like. The hydrocarbon solvents may, for example, be selected from the group consisting of n-octane, iso-octane (2,2,4-trimethylpentane), n-dodecane, iso-dodecane (2,2,4,6,6-pentamethylheptane), and other isoparaffinic solvents. Exemplary hydrocarbon solvents such as isoparaffinic solvents, for example, are commercially available under the trademarks ISOPAR C, ISOPAR E, and ISOPAR H (ExxonMobil Chemical Co.). The hydrocarbon solvent may comprise less than 99 percent by weight of the free radical initiator system.

In one embodiment the free radical initiator system may further include a polar co-solvent. The polar co-solvent may be an alcohol co-solvent, for example, a $C_1$ to $C_{30}$ alcohol. Additionally, the alcohol functionality of the alcohol co-solvent may, for example, be mono-functional or multi-functional. Exemplary alcohols as a polar co-solvent include, but are not limited to, isopropanol (2-propanol), ally alcohol (1-pentanol), methanol, ethanol, propanol, butanol, 1,4-butanediol, combinations thereof, mixtures thereof, and the like. The polar co-solvent may comprise less than 40 percent by weight of the free radical initiator system.

The polar co-solvent may be an aldehyde. Aldehydes are generally known to a person of skill in the art; for example, propionaldehyde may be used as a polar co-solvent. However, the reactivity potential of aldehydes as chain transfer agents should be taken into account when using such aldehydes as polar co-solvents. Such reactivity potentials are generally known to a person of skill in the art.

The polar co-solvent may be a ketone. Ketones are generally known to a person of skill in the art; for example, acetone may be used as polar co-solvents. However, the reactivity potential of ketones as chain transfer agents should be taken into account when using such ketones as polar co-solvents. Such reactivity potentials are generally known to a person of skill in the art.

In one embodiment the free radical initiator system may further comprise a chain transfer agent as a solvent or as a blend for simultaneous injection. As previously discussed, chain transfer agents are generally known to a person of skill in the art, and they include, but are not limited to, propane, isobutane, acetone, propylene, isopropanol, butene-1, propionaldehyde, and methyl ethyl ketone. In other disclosed processes, chain transfer agent may be charged into the reactor via a separate inlet port from the initiator system. In another embodiment process, a chain transfer agent may be blended with ethylene, pressurized, and then injected into the reactor in its own injection system.

In one embodiment a peroxide initiator may initially be dissolved or diluted in a hydrocarbon solvent, and then a polar co-solvent added to the peroxide initiator/hydrocarbon solvent mixture prior to metering the free radical initiator system into the polymerization reactor. In one embodiment a peroxide initiator may be dissolved in the hydrocarbon solvent in the presence of a polar co-solvent.

In one embodiment the free-radical initiator used in the process may initiate the graft site on the polysiloxane by extracting the extractable hydrogen from the polysiloxane. Example free-radical initiators include those free radical initiators previously discussed, such as peroxides and azo compounds. In one embodiment ionizing radiation may also be used to free the extractable hydrogen and create the radicalized site on the polysiloxane. Organic initiators are preferred means of extracting the extractable hydrogen, such as using dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, lauryl peroxide, and tert-butyl peracetate, t-butyl-α-cumyl peroxide, di-t-butyl peroxide, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A preferred azo compound is azobisisobutyl nitrite.

Suitable catalysts for use in process of this invention include any compound or combination of compounds that is adapted for preparing polymers of the desired composition or type, either the polysiloxanes or the highly branched ethylene-based polymers. Both heterogeneous and homogeneous catalysts, and combinations thereof, may be employed. In one embodiment heterogeneous catalysts, including the well known Ziegler-Natta compositions, especially Group 4 metal halides supported on Group 2 metal halides or mixed halides and alkoxides and the well known chromium or vanadium based catalysts, may be used. In one embodiment the catalysts for use may be homogeneous catalysts comprising a relatively pure organometallic compound or metal complex, especially compounds or complexes based on metals selected from Groups 3-10 or the Lanthanide series. If more than one catalyst is used in a system, it is preferred that any catalyst employed not significantly detrimentally affect the performance of another catalyst under the conditions of polymerization. Desirably, no catalyst is reduced in activity by greater than 25 percent, more preferably greater than 10 percent under the conditions of the polymerization. Examples of preferred catalyst systems may be found in U.S. Pat. No. 5,272,236 (Lai, et al.); U.S. Pat. No. 5,278,272 (Lai, et al.); U.S. Pat. No. 6,054,544 (Finlayson, et al.); U.S. Pat. No. 6,335,410 (Finlayson, et al.); and U.S. Pat. No. 6,723,810 (Finlayson, et al.); and WO 2003/091262 (Boussie, et al.); 2007/136497 (Konze, et al.); 2007/136506 (Konze, et al.); 2007/136495 (Konze, et al.); and 2007/136496 (Aboelella, et al.). Other suitable catalysts may be found in U.S. Patent Publication No. 2007/0167578 (Arriola; et al.).

In one embodiment a coordination-catalysis polymerization process may be used for the formation of the polysiloxane. In such an embodiment the catalyst systems would have a suitable tolerance to polar impurities that would result from impurities in the ethylene feed and degradation products from free-radical initiators. Control of the amount of polar impurities fed to the front portion of the reactor for the target catalyst efficiency could be accomplished by controlling the amount of polar solvent used in the initiator mixture and by the amount of material condensed in the process recycle streams. A type of coordination catalyst may include constrained geometry catalysts (CGC) as described in U.S. Pat. Nos. 5,272,236 and 5,278,272. Preferred catalysts in such a CGC system may include the general family of zirconium catalysts with biphenyl-phenol ligands, including bis((2-oxoyl-3-(1,1-dimethylethyl)phen-1-yl)-5-(methyl)phenyl)-2-phenoxy) propane-1,2-diylzirconium (IV) dimethyl and bis((2-oxoyl-3-(dibenzo-1H-pyrrole-1-yl)-5-(methyl)phenyl)-2-phenoxy)-trans-cyclo-hexane-1,2-dimethylenyl-1,2-diylzirconium (IV) dimethyl, because they are known to have a good tolerance to polar impurities. Free radical initiators that generate carbon radicals reduce the amount of polar impurities in the system and potentially make the use of more conventional catalysts possible. Examples of carbon-centered free radical generators include azo compounds, including but not limited to, azo-bis-is-butyro-nitrile. Such compounds may have a half-life decomposition temperature of about 30 to about 250° C. Carbon-carbon initiators, examples of such include dimethyl diphenyl butane, dimethyl diphenyl hexane, and derivatives thereof, may be used to reach suitable half-life times under proscribed operating conditions.

In one embodiment employing a complex metal catalyst, such a catalyst may be activated to form an active catalyst composition by combination with a cocatalyst, preferably a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. So-called modified methyl aluminoxane (MMAO) is also suitable for use as a cocatalyst. One technique for preparing such modified aluminoxane is disclosed in U.S. Pat. No. 5,041,584 (Crapo, et al.). Aluminoxanes can also be made as disclosed in U.S. Pat. No. 5,542,199 (Lai, et al.); U.S. Pat. No. 4,544,762 (Kaminsky, et al.); U.S. Pat. No. 5,015,749 (Schmidt, et al.); and U.S. Pat. No. 5,041,585 (Deavenport, et al.). Other preferred cocatalysts are inert, noncoordinating, boron compounds, such as perfluoroarylborane ($B(C_6F_5)_3$) and the class of compounds known as (bis-hydrogenated tallowalkyl)methylammonium tetrakis(pentafluorophenyl)borates, which are mixtures of complexes with the general chemical structure ($[R_2NCH_3]+[B(C_6F_5)_4]-$, wherein R may be a $C_{14}$, $C_{16}$ or $C_{18}$ alkyl. Other preferred cocatalysts may be found in U.S. Patent Publication No. 2007/0167578.

In one embodiment processing aids, such as plasticizers, can also be included in the inventive polymer. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). One other suitable oil is TUFFLO oil (Lyondell Lubricants; Houston, Tex.).

In one embodiment the polymers of this invention are treated with one or more stabilizers, for example, antioxidants, such as IRGANOX 1010 and IRGAFOS 168 (Ciba Specialty Chemicals; Glattbrugg, Switzerland). In general, the polymers are treated with one or more stabilizers before extrusion or other melt processes. In one embodiment polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The polymer composition may, for example, comprise less than 10 percent by the combined weight of one or more additives, based on the weight of the inventive polymer.

The inventive polymer may further be compounded. In one inventive polymer composition one or more antioxidants may further be compounded into the polymer and the compounded polymer pelletized. The compounded polymer may contain any amount of one or more antioxidants. For example, the compounded polymer may comprise from 200 to 600 parts of one or more phenolic antioxidants per one million parts of the polymer. In addition, the compounded polymer may comprise from 800 to 1200 parts of a phosphite-based antioxidant per one million parts of polymer. The compounded polymer may further comprise from 300 to 1250 parts of calcium stearate per one million parts of polymer.

Uses

The polymer of this invention may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the ethylenic polymer include blends with other natural or synthetic materials, polymers, additives, reinforcing agents, ignition resistant additives, antioxidants, stabilizers, colorants, extenders, crosslinkers, blowing agents, and plasticizers.

The inventive polymer may be used in producing fibers for other applications. Fibers that may be prepared from the polymer of this invention, or a blend comprising a polymer of his invention, include staple fibers, tow, multi-component, sheath/core, twisted, and monofilament. Suitable fiber forming processes include spin-bonded, melt blown techniques, as disclosed in U.S. Pat. No. 4,340,563 (Appel, et al.), U.S. Pat. No. 4,663,220 (Wisneski, et al.), U.S. Pat. No. 4,668,566 (Nohr, et al.), and U.S. Pat. No. 4,322,027 (Reba), gel-spun fibers as disclosed in U.S. Pat. No. 4,413,110 (Kavesh, et al.), woven and nonwoven fabrics, as disclosed in U.S. Pat. No. 3,485,706 (May), or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

The inventive polymer may be used in a variety of films, including but not limited to, clarity shrink films, collation shrink films, cast stretch films, silage films, stretch hood, sealants, and diaper backsheets.

The inventive polymer is also useful in other direct end-use applications. The inventive polymer is useful for wire and cable coating operations, in sheet extrusion for vacuum forming operations, and forming molded articles, including the use of injection molding, blow molding process, or rotomolding processes. Compositions comprising the inventive polymer can also be formed into fabricated articles using conventional polyolefin processing techniques.

Other suitable applications for the inventive polymer include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

Further treatment of the polymer of this invention may be performed for application to other end uses. For example, dispersions (both aqueous and non-aqueous) can also be formed using the present polymers or formulations comprising the same. Frothed foams comprising the inventive polymer can also be formed, as disclosed in PCT Publication No. 2005/021622 (Strandeburg, et al.). The inventive polymer may also be crosslinked by any known means, such as the use of peroxide, electron beam, silane, azide, or other crosslinking technique. The inventive polymer can also be chemically modified, such as by grafting (for example by use of maleic anhydride (MAH), silanes, or other grafting agent), halogenation, amination, sulfonation, or other chemical modification.

Additives may be added to the inventive polymer post-formation. Suitable additives include stabilizers, fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the inventive polymer with other polyolefins may be performed. Suitable polymers for blending with the inventive polymer include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company) and VISTAMAXX™ (ExxonMobil Chemical Co.)) can also be useful as components in blends comprising the inventive polymer.

Blends and mixtures of the inventive polymer may include thermoplastic polyolefin blends (TPO), thermoplastic elastomer blends (TPE), thermoplastic vulcanizates (TPV) and styrenic polymer blends. TPE and TPV blends may be prepared by combining inventive polymers, including functionalized or unsaturated derivatives thereof, with an optional rubber, including conventional block copolymers, especially an SBS block copolymer, and optionally a crosslinking or vulcanizing agent. TPO blends are generally prepared by blending the polymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779 (Ajbani, et al.).

Definitions

Any reference to the Periodic Table of Elements is that as published by CRC Press, Inc., 1990-1991. Reference to a group of elements in this table is by the new notation for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, density, melt index, molecular weight, reagent amounts and process conditions.

The term "composition," as here used means a combination of two or more materials. With the respective to the inventive polymer, a composition is the inventive polymer in combination with at least one other material, e.g., an additive, filler, another polymer, catalyst, etc. In the context of this invention, the inventive polymer is not a composition because of the presence of unreacted siloxane and/or ethylene-based polymer since the association of these materials with a polymer as described by formula 1 is part of the definition of the inventive polymer.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene based on the weight of the polymer and, optionally, may comprise at least one comonomer.

The term "ethylene-based interpolymer" refers to an interpolymer that comprises a majority amount of polymerized ethylene based on the weight of the interpolymer, and comprises at least one comonomer.

The term "no appreciable" as used in the context of reporting alkyl branches in a $^{13}C$ NMR analysis means that at a given signal to noise ratio, the branch was not detectable.

The term "multi-part reactor" as used herein refers to a reactor with multiple reaction zones wherein a reaction zone typically includes a feed port and/or one or more physical barriers.

Additional Embodiments of the Invention

In one embodiment of the invention, a polymer comprises units derived from ethylene and siloxane, the polymer having at least 0.15, or at least 0.5, or at least 0.8, units of amyl groups per 1000 carbon atoms as determined by $^{13}C$ Nuclear Magnetic Resonance (NMR).

In one embodiment the inventive polymer comprises a portion of the ethylene bonded to one or more silicon atoms.

In one embodiment the inventive polymer comprises at least one ethylene-based polymeric branch bonded to the siloxane at a silicon atom.

In one embodiment the ethylene-based polymeric branch bonded to the siloxane at a silicon atom of the inventive polymer contains long chain branching.

In one embodiment the siloxane units of the inventive polymer of any of the preceding embodiments are derived from a siloxane polymer that has a weight average molecular weight of 100 or greater.

In one embodiment the siloxane units of the polymer of any of the preceding embodiments are derived from a siloxane polymer that has a viscosity of 100 centistokes or greater.

In one embodiment the inventive polymer of any of the preceding embodiments comprises at least 1, or at least 1.2, or at least 1.4, units of C6+ branches as determined by $^{13}C$ NMR.

In one embodiment the inventive polymer of any of the preceding embodiments comprises no appreciable methyl branches as determined by $^{13}C$ NMR.

In one embodiment the inventive polymer of any of the preceding embodiments comprises no appreciable propyl branches as determined by $^{13}C$ NMR.

In one embodiment the inventive polymer of any of the preceding embodiments comprises no greater than 5, or no greater than 3 or no greater than 2, units of amyl groups per 1000 carbon atoms as determined by $^{13}C$ NMR.

In one embodiment the inventive polymer of any of the preceding embodiments has a peak melting temperature Tm in °C. and density in g/cm³ that satisfies the mathematical relationship:

$$Tm < 771.5 (° C. \cdot cc/g) \times (density) - 604 (° C.).$$

In one embodiment the inventive polymer of any of the preceding embodiments has a peak melting temperature Tm in ° C. and density in g/cm³ that satisfies the mathematical relationship:

$$Tm < 771.5(°C.\cdot cc/g) \times (density) - 605.5(°C.).$$

In one embodiment the inventive polymer of any of the preceding embodiments has a heat of fusion ($H_f$) in Joules/grams (J/g) and density in g/cm³ that satisfies the mathematical relationship:

$$H_f < 2333 \, (J \cdot cc/g^2) \times (density) - 2009 \, (J/g).$$

In one embodiment the inventive polymer of any of the preceding embodiments has a heat of fusion ($H_f$) in Joules/grams (J/g) and density in g/cm³ that satisfies the mathematical relationship:

$$H_f < 2333 \, (J \cdot cc/g^2) \times (density) - 2020 \, (J/g).$$

In one embodiment the inventive polymer of any of the preceding embodiments has a density of at least 0.93 g/cm³.

In one embodiment the inventive polymer of any of the preceding embodiments has a melt index ($I_2$) of less than 15, or less than 5, or less than 3.

In one embodiment the inventive polymer of any of the preceding embodiments has a melt index ($I_2$) of greater than 0.1, or greater than 0.5.

In one embodiment the inventive polymer of any of the preceding embodiments has a melt flow ratio ($I_{10}/I_2$) of least 13, or of at least 20, or of at least 40, or of at least 100, or of at least 200.

In one embodiment the inventive polymer of any of the preceding embodiments has a melt flow ratio ($I_{10}/I_2$) of least 100 or of at least 200.

In one embodiment the inventive polymer of any of the preceding embodiments has an $I_2$ of less than 5 and an $I_{10}/I_2$ of greater than 13.

In one embodiment the inventive polymer of any of the preceding embodiments has an $I_2$ of less than 5 or less than 3 and an $I_{10}/I_2$ of greater than 30 or greater than 40.

In one embodiment the inventive polymer of any of the preceding embodiments has an $I_2$ of less than 20 or less than 15 and an $I_{10}/I_2$ of greater than 12.

In one embodiment the inventive polymer has a molecular weight distribution of 5 to 14, or 5 to 10.

In one embodiment the inventive polymer comprises 20 to 40 weight percent siloxane based on the weight of the polymer.

In one embodiment the invention is a composition comprising the inventive polymer of any of the preceding polymer embodiments.

In one embodiment the composition of the preceding embodiment comprises one or more additives.

In one embodiment the invention is an article comprising a composition of any of the preceding composition embodiments.

In one embodiment the article comprises at least one component formed from a composition of any of the composition embodiments.

In one embodiment the article of any of the preceding article embodiments is in the form of a film.

In one embodiment the film of the preceding film embodiment has a coefficient of friction (COF) such that siloxane does not migrate to the surface of the film.

In one embodiment the kinetic COF of the film of the preceding film embodiment is less than 0.2.

In one embodiment the static COF of the film of the preceding film embodiments is less than 0.25.

In one embodiment the invention is a process to form a polymer comprising units derived from ethylene and siloxane, the process comprising:

A. Contacting at least one siloxane with ethylene in the presence of a free-radical initiator in a first reactor or a first part of a multi-part reactor; and B. Reacting the siloxane with additional ethylene in the presence of the free-radical initiator to form an ethylene-based polymeric branch bonded to the siloxane in at least one other reactor or a later part of the multi-part reactor.

In one process embodiment the ethylene-based polymeric branch is formed by the ethylene monomer bonding with the siloxane to form a ethylene-siloxane moiety, and the resulting moiety polymerizing with at least additional ethylene monomer to form the ethylene-based polymeric branch.

In one process embodiment the ethylene-based polymeric branch is formed independently of the siloxane and is then grafted to the siloxane.

In one embodiment the invention is a polymer made by any of the processes embodiments.

In one embodiment the inventive polymer comprises less than 40, or less than 30, or less than 20, or less than 10, weight percent of siloxane that is extractable by solvent extraction.

In one embodiment the inventive composition comprises less than 40, or less than 30, or less than 20, or less than 10, weight percent of siloxane that is extractable by solvent extraction.

EXPERIMENTAL

Reference Resins

Thirty commercially available LDPE resins (designated "Commercially Available Resins" or "CAR") are tested for density, melt index ($I_2$), heat of fusion, peak melting temperature, g', gpcBR, and LCBf using the Density, Melt Index, DSC Crystallinity, Gel Permeation Chromatography, g' by 3D-GPC, and gpcBR Branching Index by 3D-GPC methods, all described infra. The Commercially Available Resins have the properties listed in Table 1.

TABLE 1

| CAR Properties | | | | | | |
|---|---|---|---|---|---|---|
| Commercially Available Resins | Density (g/cm³) | Melt Index ($I_2$) (g/10 min) | Heat of Fusion (J/g) | Peak $T_m$ (°C.) | gpcBR Whole | LCBf |
| CAR1 | 0.920 | 0.15 | 147.2 | 110.9 | 1.26 | 2.05 |
| CAR2 | 0.922 | 2.5 | 151.1 | 111.4 | 0.89 | 2.03 |
| CAR3 | 0.919 | 0.39 | 146.8 | 110.4 | 1.19 | 2.39 |
| CAR4 | 0.922 | 0.80 | 155.0 | 112.5 | 0.78 | 1.99 |
| CAR5 | 0.916 | 28 | 139.3 | 106.6 | 1.27 | 3.59 |
| CAR6 | 0.917 | 6.4 | 141.5 | 107.8 | 1.48 | 3.24 |
| CAR7 | 0.924 | 1.8 | 155.1 | 112.2 | 0.77 | 1.84 |
| CAR8 | 0.926 | 5.6 | 157.9 | 113.4 | 0.57 | 1.64 |
| CAR9 | 0.923 | 0.26 | 151.4 | 110.3 | 1.13 | 2.06 |
| CAR10 | 0.924 | 0.22 | 151.2 | 111.4 | 1.03 | 1.96 |
| CAR11 | 0.924 | 0.81 | 154.1 | 112.3 | 0.95 | 2.48 |
| CAR12 | 0.926 | 5.9 | 158.0 | 113.1 | 0.70 | 1.90 |
| CAR13 | 0.924 | 2.0 | 155.2 | 111.8 | 0.84 | 2.03 |
| CAR14 | 0.923 | 4.1 | 157.3 | 111.6 | 1.26 | 2.32 |
| CAR15 | 0.922 | 33 | 153.5 | 111.8 | 0.46 | 1.95 |
| CAR16 | 0.922 | 4.1 | 151.0 | 109.3 | 1.89 | 2.61 |
| CAR17 | 0.918 | 0.46 | 141.2 | 107.4 | 3.09 | 3.33 |
| CAR18 | 0.921 | 2.1 | 145.9 | 110.2 | 0.85 | 2.11 |
| CAR19 | 0.918 | 8.2 | 143.2 | 106.4 | 2.27 | 3.20 |
| CAR20 | 0.922 | 0.67 | 148.7 | 110.4 | 0.68 | 1.59 |
| CAR21 | 0.924 | 0.79 | 154.2 | 111.8 | 0.74 | 1.96 |
| CAR22 | 0.922 | 0.25 | 150.0 | 110.5 | 0.92 | 1.92 |
| CAR23 | 0.924 | 3.4 | 153.6 | 111.3 | 0.65 | 1.94 |

TABLE 1-continued

CAR Properties

| Commercially Available Resins | Density (g/cm³) | Melt Index (I₂) (g/10 min) | Heat of Fusion (J/g) | Peak $T_m$ (° C.) | gpcBR Whole | LCBf |
|---|---|---|---|---|---|---|
| CAR24 | 0.921 | 4.6 | 148.2 | 106.9 | 1.49 | 2.54 |
| CAR25 | 0.923 | 20 | 150.9 | 108.9 | NM | 2.21 |
| CAR26 | 0.925 | 1.8 | 157.5 | 112.4 | 0.82 | 1.86 |
| CAR27 | 0.923 | 0.81 | 153.7 | 111.5 | 0.87 | 1.94 |
| CAR28 | 0.919 | 6.8 | 145.1 | 105.7 | 1.72 | 2.75 |
| CAR29 | 0.931 | 3.6 | 167.3 | 115.6 | NM | NM |
| CAR30 | 0.931 | 2.3 | 169.3 | 115.8 | NM | NM |

"NM" means not measured.

Test Methods

Density

Samples that are measured for density are prepared according to ASTM D 1928. Samples are pressed at 374° F. (190° C.) and 30,000 psi for 3 minutes, and then at 70° F. (21° C.) and 30,000 psi for 1 minute. Density measurements are made within one hour of sample pressing using ASTM D792, Method B.

Melt Index

Melt index, or $I_2$, is measured in accordance by ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

Viscosity Determination for Siloxane

Viscosities up to 100,000 centistokes can be measured by ASTM D-445, IP 71 (at 25° C., constant temperature water bath, equilibration time at least 15 minutes) using a glass capillary viscometer such as an Ubbelohde viscometer. Viscosities above 100,000 centistokes can be measured using rotational viscometers, such as a Brookfield Synchro-lectric viscometer, or a Wells-Brookfield Core/Plate viscometer, available from Brookfield Engineering Laboratories, employing test methods ASTM D-1084 at 25 C (for a cup/spindle viscometer) and ASTM D-4287 at 25 C (for a cone/plate viscometer).

DSC Crystallinity

Differential Scanning calorimetry (DSC) can be used to measure the crystallinity of a sample at a given temperature for a wide range of temperatures. For the Examples, a TA model Q1000 DSC (TA Instruments; New Castle, Del.) equipped with an RCS (Refrigerated Cooling System) cooling accessory and an auto-sampler module is used to perform the tests. During testing, a nitrogen purge gas flow of 50 ml/min is used. Resins are compression-molded into 3 mm thick by 1 inch circular plaques at 350° C. for 5 minutes under 1500 psi pressure in air. The sample is then taken out of the press and placed on a counter top to cool to room temperature (~25° C.). A 3-10 mg sample of the cooled material is cut into a 6 mm diameter disk, weighed, placed in a light aluminum pan (ca 50 mg), and crimped shut. The sample is then tested for its thermal behavior.

The thermal behavior of the sample is determined by changing the sample temperature upwards and downwards to create a response versus temperature profile. The sample is first rapidly heated to 180° C. and held at an isothermal state for 3 minutes in order to remove any previous thermal history. Next, the sample is then cooled to −40° C. at a 10° C./min cooling rate and held at −40° C. for 3 minutes. The sample is then heated to 150° C. at a 10° C./min heating rate. The cooling and second heating curves are recorded. The values determined are peak melting temperature ($T_m$), peak crystallization temperature ($T_c$), heat of fusion ($H_f$) (in J/g), and the calculated percent crystallinity for polyethylene samples using Equation 2:

$$\% \text{ Crystallinity} = ((H_f)/(292 \text{ J/g})) \times 100 \qquad (\text{Eq. 2}).$$

The heat of fusion ($H_f$) and the peak melting temperature are reported from the second heat curve. Peak crystallization temperature is determined from the cooling curve.

Gel Permeation Chromatography (GPC)

The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using Equation 3 (as described in Williams and Ward, *J. Polym. Sci., Polym. Let.*, 6, 621 (1968)):

$$M_{polyethylene} = A \times (M_{polystyrene})^B \qquad (\text{Eq. 3}),$$

where M is the molecular weight of polyethylene or polystyrene (as marked), A has a value of 0.43, and B is equal to 1.0. Use of this polyethylene calibration to obtain molecular weight distributions and related statistics is defined as the method of Williams and Ward. Other values of A and B in Equation 3 may result from different choices of the Mark-Houwink K and a (sometimes referred to as α) values for polystyrene and polyethylene and are referred to generally as a conventionally calibrated 3D-GPC.

With 3D-GPC absolute weight average molecular weight ("$M_{w, Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log ($M_W$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume offset determination, are obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

gpcBR Branching Index by 3D-GPC

In the 3D-GPC configuration the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 4 and 5:

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad \text{(Eq. 4)}$$

and $$[\eta]_{PE} = K_{PS} \cdot M_{PS}^{\alpha+1} / M_{PE}. \quad \text{(Eq. 5)}$$

The gpcBR branching index is a robust method for the characterization of long chain branching. Yau, Wallace W., "Examples of Using 3D-GPC-TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_w$ by the light scattering (LS) detector using the peak area method. The method avoids the slice-by-slice ratio of light scattering detector signal over the concentration detector signal as required in the g' determination.

$$M_W = \sum_i w_i M_i \quad \text{(Eq. 6)}$$
$$= \sum_i \left(\frac{C_i}{\sum_i C_i}\right) M_i$$
$$= \frac{\sum_i C_i M_i}{\sum_i C_i}$$
$$= \frac{\sum_i LS_i}{\sum_i C_i}$$
$$= \frac{LS \text{ Area}}{Conc. \text{ Area}}.$$

The area calculation in Equation 6 offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) is obtained by the area method shown in Equation 7:

$$IV = [\eta] \quad \text{(Eq. 7)}$$
$$= \sum_i w_i IV_i$$
$$= \sum_i \left(\frac{C_i}{\sum_i C_i}\right) IV_i$$
$$= \frac{\sum_i C_i IV_i}{\sum_i C_i}$$
$$= \frac{\sum_i DP_i}{\sum_i C_i}$$
$$= \frac{DP \text{ Area}}{Conc. \text{ Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 8 and 9:

$$Mw_{CC} = \sum_i \left(\frac{C_i}{\sum_i C_i}\right) M_i = \sum_i w_i M_i, \quad (Eq.\ 8)$$

and $$[\eta]_{CC} = \sum_i \left(\frac{C_i}{\sum_i C_i}\right) IV_i = \sum_i w_i IV_i. \quad (Eq.\ 9)$$

Equation 10 is used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \quad (Eq.\ 10)$$

where [η] is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The Mw by light scattering (LS) using Equation (6) is commonly referred to as the absolute Mw; while the Mw,cc from Equation (8) using conventional GPC molecular weight calibration curve is often referred to as polymer chain Mw. All statistical values with the "cc" subscript are determined using their respective elution volumes, the corresponding conventional calibration as previously described, and the concentration ($C_i$) derived from the mass detector response. The non-subscripted values are measured values based on the mass detector, LALLS, and viscometer areas. The value of $K_{PE}$ is adjusted iteratively until the linear reference sample has a gpcBR measured value of zero. For example, the final values for α and Log K for the determination of gpcBR in this particular case are 0.725 and −3.355, respectively, for polyethylene, and 0.722 and −3.993 for polystyrene, respectively.

Once the K and α values have been determined, the procedure is repeated using the branched samples. The branched samples are analyzed using the final Mark-Houwink constants as the best "cc" calibration values and applying Equations 6-10.

The interpretation of gpcBR is straight forward. For linear polymers, gpcBR calculated from Equation 10 will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w,cc}$ and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination. In other particular cases, other methods for determining $M_w$ moments may be preferable to the aforementioned technique.

Nuclear Magnetic Resonance ($^{13}$C NMR)

The samples are prepared by adding approximately 2.7 g of a 50/50 mixture of tetrachloroethane-d2/orthodichlorobenzene containing 0.025 M Cr(AcAc)$_3$ (tris(acetylacetonato)-chromium(III)) to 0.25 g sample in a NORELL 1001-7 10 mm NMR tube. The samples are dissolved and homogenized by heating the tube and its contents to 150° C. using a heating block and heat gun. Each sample is visually inspected to ensure homogeneity.

The data are collected using a BRUKER 400 MHz spectrometer equipped with a BRUKER DUAL DUL high-temperature CRYOPROBE. The data are acquired using 320 transients per data file, a 6 second pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. The $^{13}$C NMR chemical shifts are internally referenced to the EEE triad at 30.0 ppm.

Identification and Quantification of Various Branch Types in LDPE

Figure 2:
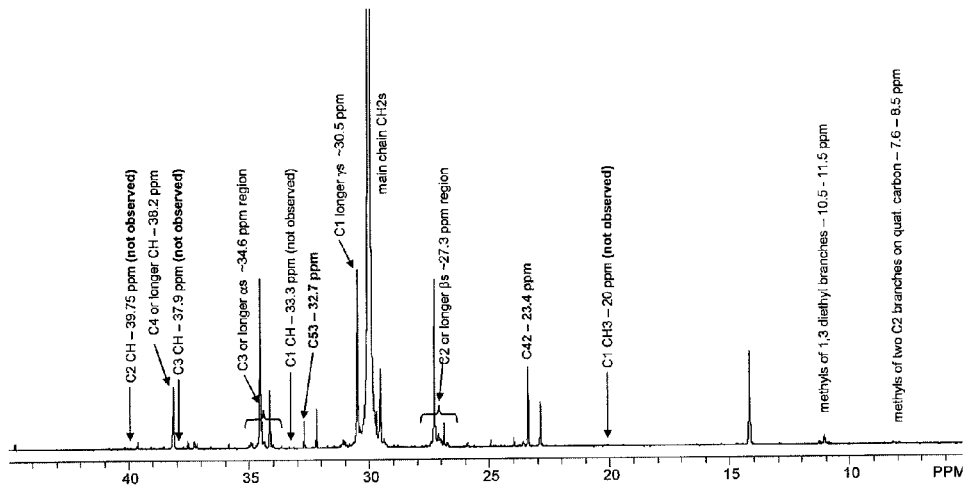
FIG. 2 is a $^{13}$C NMR spectrum of LDPE showing locations of peaks characteristic of different branch types.

FIG. 2 shows the $^{13}$C NMR spectrum of an LDPE (Sample C-3 below), and indicates characteristic peaks resulting from various branch lengths. Only the most important identifying peaks are labeled. Assignments for the remaining peaks are given in Table 2. C53 refers to the third carbon in a 5-carbon branch with the methyl counted as carbon 1.

TABLE 2

Characteristic Chemical Shifts for Branches of 1 to 6 or More Carbons as Observed in Polyethylene

| Br Length | Methines | Alphas | Betas | Bx1 (Methyl) | Bx2 | Bx3 | Bx4 | Bx5 | Bx6 |
|---|---|---|---|---|---|---|---|---|---|
| 1 | 33.3± | 37.6± | 27.5± | 20.0± | — | — | — | — | — |
| 2 | 39.8± | 34.1± | 27.3* | 11.1± | 26.8± | — | — | — | — |
| 3 | 37.9± | 34.6* | 27.3* | 14.7± | 20.3± | 37.0± | — | — | — |
| 4 | 38.2* | 34.6* | 27.3* | 14.1* | 23.4± | 29.6 | 34.2 | — | — |
| 5 | 38.2* | 34.6* | 27.3* | 14.1* | 22.9* | 32.7± | 26.9 | 34.6* | — |

TABLE 2-continued

Characteristic Chemical Shifts for Branches of 1
to 6 or More Carbons as Observed in Polyethylene

| Br Length | Methines | Alphas | Betas | Bx1 (Methyl) | Bx2 | Bx3 | Bx4 | Bx5 | Bx6 |
|---|---|---|---|---|---|---|---|---|---|
| 6 or more | 38.2* | 34.6* | 27.3* | 14.1* | 22.9* | 32.2* | 30.4^ | 27.3* | 34.6* |
| PE Chain Ends | — | — | — | 14.1* | 22.9* | 32.3* | 29.6^ | — | — |

±values are unique peaks that can be used for ID and/or quantification.
*values indicate that the shift overlaps with other branching.
^values indicate that the shift was not resolved/overlap with large 30 ppm peak.

Determination of C5 (Amyl) Branching

Figure 3:
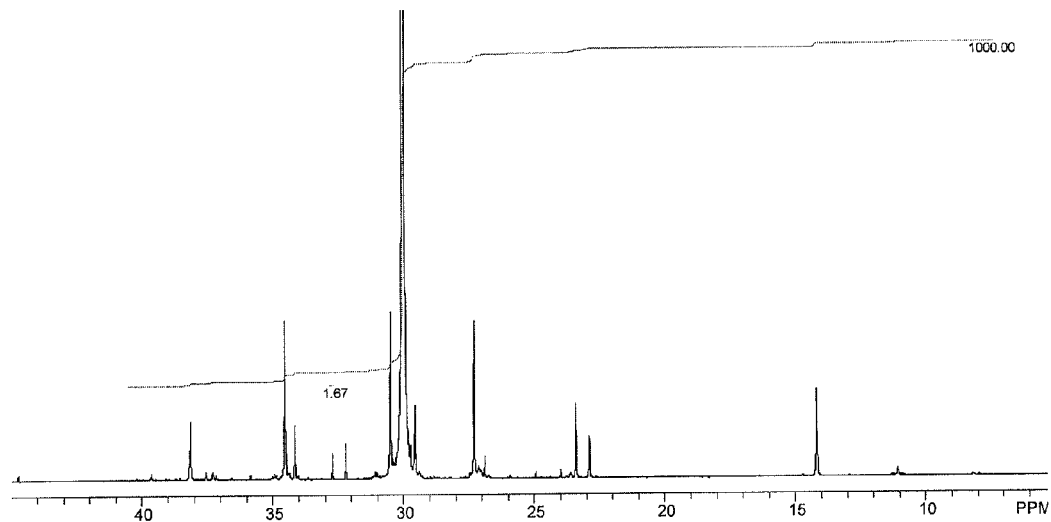
FIG. 3 is a $^{13}$C NMR spectrum of LDPE showing an example of quantification of C5 branches/1000 carbons.

C5 (amyl) branches are determined by the peak at 32.7 ppm. The number of C5 branches per 1000 total carbons is determined by setting the integral of the full LDPE spectrum, about 40 to 5 ppm, to a value of 1000, and integrating the 32.7 ppm peak. The 32.7 ppm peak integral is then a direct measure of the number of C5 branches per 1000 carbons. The example in FIG. 3 contains 1.67 C5 branches/1000C.

Determination of C1 (Methyl) Branches

Figure 4:
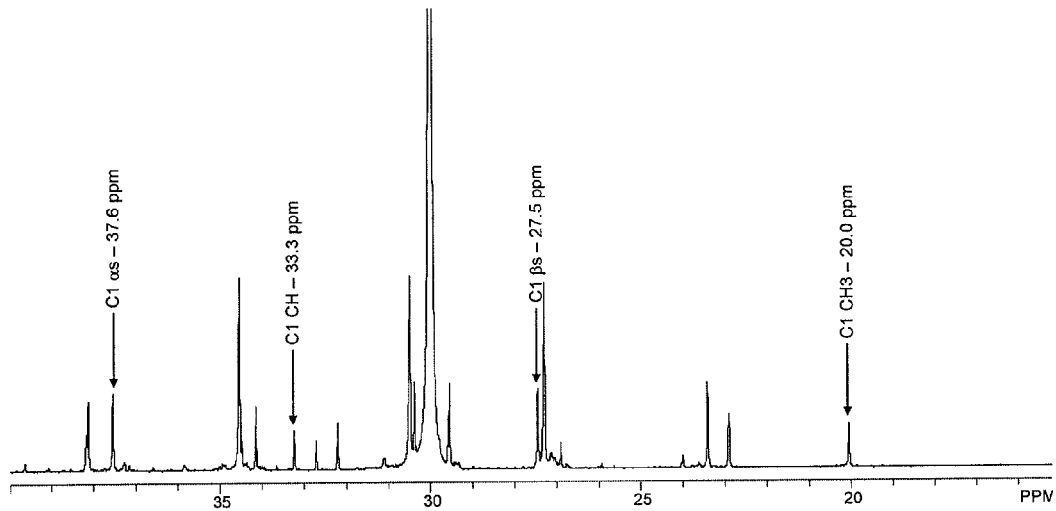
FIG. 4 is a $^{13}$C NMR spectrum of LDPE containing C1 branches.

C1 branches result in peaks at about 20, 33.3, 37.6, and 27.5 ppm. FIG. 4 shows a $^{13}$C NMR spectrum of sample 384561 which was produced using propylene as the chain transfer agent (CTA), and therefore exhibits a significant level of C1 (methyl) branches. This is because propylene acts both as a CTA and as a comonomer, and introduces C1 branches as would be observed in an ethylene-propylene LLDPE.

Determination of C3 (Propyl) Branches

Figure 5:
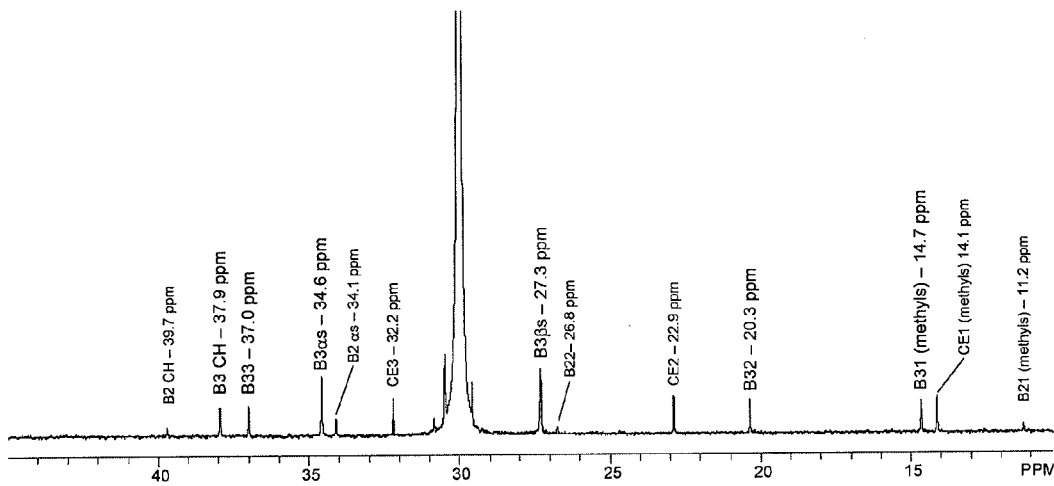
FIG. 5 is a $^{13}$C NMR spectrum of HDPE containing C3 (propyl) branches from a pentene comonomer.

C3 branches result in peaks at 37.9, 37.0, 20.3 and 14.7 ppm (and others that would be obscured in a LDPE spectrum). FIG. 5 shows a $^{13}$C NMR spectrum of a HDPE made with pentene comonomer, and therefore containing C3 branches. This particular sample also contains a very low level of C2 branching from butene.

Determination of C6+ Branches

C6 and longer branching (C6+) are determined algebraically in LDPE spectra. This is due to overlap in peaks from C4, C5, and C6+ branches. C4 and C5 can be determined independently, and their sum is subtracted from peaks containing contributions of two or more of these. C6+ branches are determined by a direct measure of C6+ branches in LDPE, where the long branches are not distinguished from "chain ends". The 32.2 ppm peak, representing the 3$^{rd}$ carbon from the end of all chains or branches of 6 or more carbons, is used for C6+ determination.

Coefficient of Friction (COF)

Sample Preparation and Testing

Samples are compression molded using a brass shim, 12"×13"×0.002" with four window cutouts. Four grams of material are placed into each of the cutouts and placed in a compression molder with dual platens. The bottom platen is set at 190° C. and the top is set at 30° C. for the cooling process. Samples are placed in the press and platens closed with 3000 pounds pressure applied for 3 minutes while heated. After this period the pressure is ramped up to 10,000 pounds pressure, and sample is heated for another 3 minutes. At the end of the heating period, the pressure is ramped to 20,000 pounds and the sample maintained heat for another minute. After this cycle the platens are opened and the assembly is placed into the top plates which are set at 30° C. for the cooling phase. Samples are cycled through the same process as in the heat cycle. The final film thickness is in the 8-10 mil range. Static and Kinetic COF are measured according to ASTM D 1994-08.

Extraction of PDMS

Two grams of sample and 25 g of ethyl acetate are added to a vial, and then shaken at room temperature for three hours. The solids are removed by filtering, dried by evaporation, and weighed. The weighed, clear PDMS solids are the measure of ungrafted or free PDMS in the sample.

Sample (Inventive Polymer) Preparation

The PE-graft-PDMS polymers are made in a continuously stirred tank reactor (CSTR) with a volume of 54 ml at 2000 bar. The CSTR is equipped with an external heating jacket. The agitator speed is 2000 revolutions per minute (rpm). The ethylene flow rate is 1000 g/h. Polydimethylsiloxane (PDMS) (Dow Corning 200 Fluid 5,000 CST) is dissolved in ethyl acetate in a ratio of 1:3 by weight. The PDMS-solution is injected into the CSTR at a flow rate of 94 g/h (24.4 g/h of pure PDMS) such that ethylene polymerization occurs in the presence of the PDMS for all examples. Propionaldehyde (PA) is used as the chain transfer agent (CTA). The initiator is 2.3 g tert-butyl peroxyacetate dissolved in 500 ml n-heptane. Sample is collected in a vented polyethylene bottle, and excess gases are vented off.

The process conditions by which the PE-graft-PDMS polymers are made are reported in Table 3. The results of the PDMS grafting are reported in Table 4. The three PE-graft-PDMS polymers (Samples 1-3) and three comparative LDPE (Comparative Samples C1-C3) and their respective properties are reported in Tables 5A-5D. All of the comparative examples are high pressure, low density polyethylenes (HPLDPE).

TABLE 3

Process Conditions for the Manufacture of PE-graft-PDMS Polymers

| Sample | Description | Reaction Temperature (° C.) | % Ethylene Conversion | % free PDMS |
|---|---|---|---|---|
| 1 | Thermal conversion - No peroxide | 193 | 6 | 14 |
| 2 | Peroxide Used, Propionaldehyde CTA | 235-243 | 16.5-17.4 | 1.6 |
| 3 | Peroxide Used but no Propionaldehyde | 245 | 16 | 2.3 |

TABLE 4

PDMS Grafting Results

| Sample | Extraction | Total wt % PDMS (NMR) | wt % Free PDMS (Extractable)$^i$ | wt/wt ratio PDMS/ LDPE | S/N of main PDMS peak |
|---|---|---|---|---|---|
| 3 | Unextracted A | 25.5 | 2.4 | 0.34 | 1660 |
| 3 | Unextracted B | 23.2 |  | 0.30 | 3840 |
| 3 | Extracted | 21.7 |  | 0.28 | 920 |
| 2 | Unextracted A | 25.2 | 2.5 | 0.34 | 720 |
| 2 | Unextracted B | 22.4 |  | 0.29 | 760 |
| 2 | Extracted | 21.6 |  | 0.28 | 900 |
| 1 | Unextracted | 44.2 | 14.4 | 0.79 | 1610 |
| 1 | Extracted | 24.5 |  | 0.32 | 2000 |

Ex. 3 is the highest density sample.

All NMR results comparing the samples before and after extraction to remove free PDMS are in good agreement with the measured extractable weight fraction PDMS. Weight percent PDMS is calculated as follows:

$$[(\text{PDMS integral}/2)*74.1 \text{ g/mol}]/[(\text{LDPE integral}*14 \text{ g/mol})+(\text{PDMS integral}/2)*74.1 \text{ g/mol})] \quad (\text{Eq. 12})$$

Figure 6:
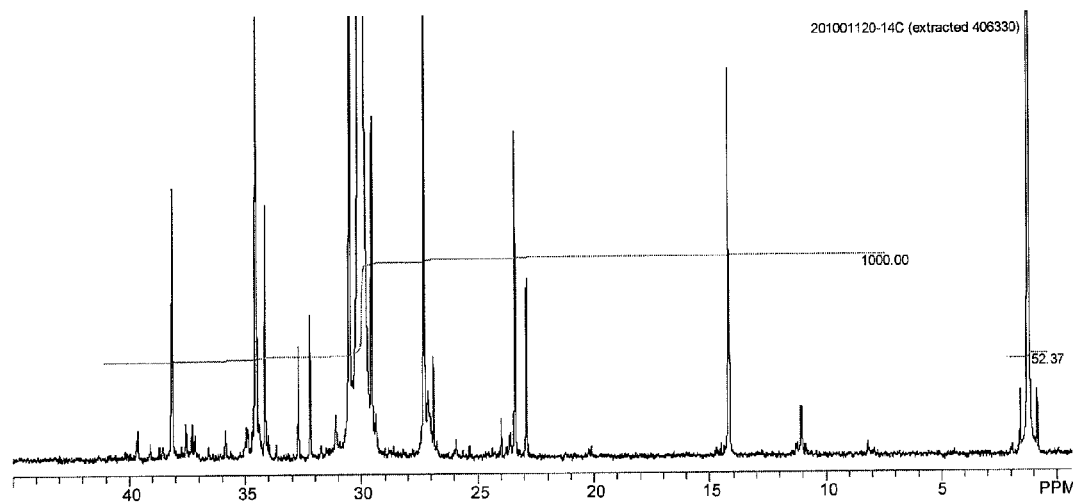
FIG. 6 is a $^{13}$C NMR spectrum of LDPE-PDMS showing integrals used to quantify the PDMS and LDPE for the extracted version of Sample 1.
Figure 7:
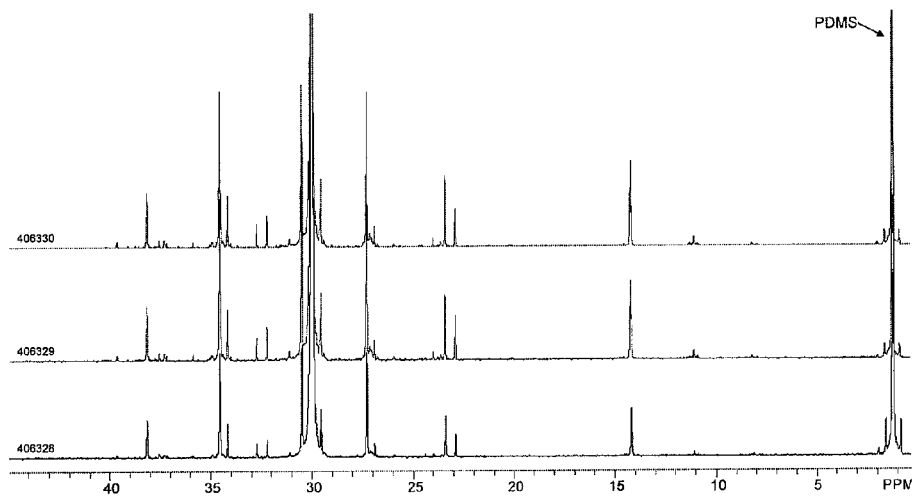
FIG. 7 is an overlay of $^{13}$C NMR spectra of three PDMS-grafted-LDPE.
Figure 8:
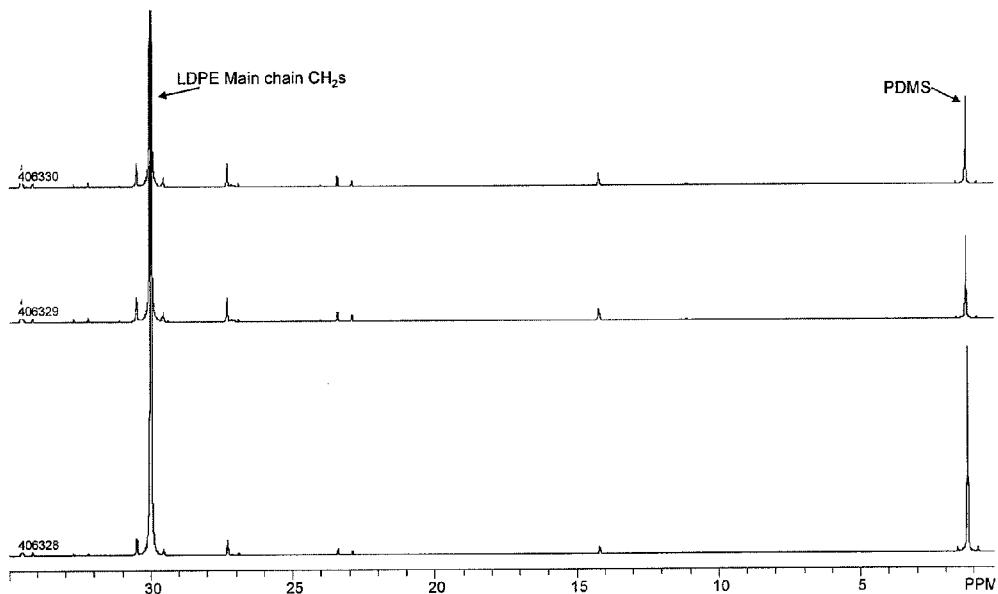
FIG. 8 is an overlay of $^{13}$C NMR spectra of three PDMS-grafted-LDPE scaled to show relative intensities of the PDMS peaks.

The PDMS integral is from ~0.3 to 2.2 ppm. The LDPE integral is from ~7.5 to 41 ppm, and includes all carbons of the LDPE. An example spectrum with integrals is shown in FIG. 6. FIGS. 7 and 8 show overlays of $^{13}$C NMR spectra of PDMS grafted LDPE. Reference numbers 406238, 406329 and 406330 refer to Samples 1, 2 and 3, respectively. The PDMS is observed at a chemical shift close to 0 ppm.

Table 5A shows the measured melt index ($I_2$), melt index ratio ($I_{10}/I_2$), and density as compared to commercial LDPE of comparable melt index. The inventive samples cover a wide melt index range of 0.72-12.4. Note that the $I_{10}/I_2$, with the higher $I_{10}/I_2$ indicating higher processability or flowing or rapidly decreasing viscosity with increasing shear rate, of the inventive Examples 1-3 are in general very high. When similar melt index materials of the Examples are compared to the Comparative Examples, the differences are dramatic: At 2 MI, the inventive example has a 260 $I_{10}/I_2$ while the comparative example has a 12.9 $I_{10}/I_2$. At 12 MI, the inventive example has a 13.2 $I_{10}/I_2$ while the comparative example has a 12.9 $I_{10}/I_2$. At 0.7 MI, the inventive example has a 47.2 $I_{10}/I_2$ while the comparative example has

TABLE 5A

Properties of PE-graft-PDMS Polymers and Three Comparative LDPE Polymers

| Example | MI ($I_2$) (g/10 min) | $I_{10}/I_2$ | Density (g/cc) |
|---|---|---|---|
| 1 | 2.0 | 260 | 0.940 |
| 2 | 12.4 | 13.2 | 0.931 |
| 3 | 0.72 | 47.2 | 0.929 |
| C-1 | 1.9 | 12.9 | 0.922 |
| C-2 | 11.7 | 9.7 | 0.918 |
| C-3 | 0.68 | 14.7 | 0.927 |

Table 5B reports the melt index (for reference) and the molecular weight properties of the three Examples and three Comparative Examples. At comparable melt index, the inventive examples in general tend to have higher weight average molecular weights ($M_w$), higher number average molecular weights ($M_n$), higher z-average molecular weights ($M_z$), comparable or higher molecular weight distributions ($M_w/M_n$), and higher long chain branching levels as indicated by either $LCB_f$ or gpcBR. These higher molecular weight moments and branching levels are a reflection of the bonding of the LDPE and the polysiloxane. This unique structure results in the advantageous processability, coefficients of friction, densities, and the like.

TABLE 5B

Properties of PE-graft-PDMS Polymers and Three Comparative LDPE Polymers

| Sample | MI ($I_2$) (g/10 min) | $M_w$ (g/mol) | $M_n$ (g/mol) | $M_w/M_n$ | $M_z$ (g/mol) | $LCB_f$ | gpcBR |
|---|---|---|---|---|---|---|---|
| 1 | 2.0 | 94,370 | 17,680 | 5.34 | 486,500 | 2.27 | 2.44 |
| 2 | 12.4 | 98,230 | 12,730 | 7.72 | 497,100 | 4.02 | 4.16 |
| 3 | 0.72 | 158,920 | 17,460 | 9.10 | 619,100 | 4.84 | 4.95 |
| C-1 | 1.9 | 81,960 | 13,870 | 5.91 | 297,900 | 2.01 | 1.75 |
| C-2 | 11.7 | 120,930 | 14,010 | 8.63 | 507,700 | 3.10 | 3.24 |
| C-3 | 0.68 | 100,220 | 16,760 | 5.98 | 362,100 | 1.03 | 1.42 |

NA = Not applicable.

Table 5C reports the melt index and density (for reference) and the DSC properties of the Examples and Comparative Examples. Very high densities for LDPE-based samples are shown (0.929-0.940 g/cc). Higher densities are desired for LDPE but are limited in part by the maximum pressure capability of the process. Densities of about 0.931 g/cc are uncommon. Higher densities are desired for down-gauging, i.e. being able to produce film at lower thickness, thus using less material, but with nearly equivalent properties to a thicker film. Higher densities can also be favorable for higher temperature resistance as well as improved modulus or rigidity of the material, e.g., film, so that its shape can be retained at higher temperatures when a film is processed, such as a shrink film, and also when that film is cut. All inventive samples are of a single melting peak. Even though the density is higher for the inventive Examples, FIG. 1 shows that at a given density, the melting point is actually lower for these samples. Also as can be seen from FIG. 9, at a given density, the heat of fusion is lower at a given density for the inventive Examples as compared to the Comparative Examples.

TABLE 5C

Properties of PE-graft-PDMS Polymers and Three Comparative LDPE Polymers

| Sample | MI ($I_2$) (g/10 min) | Density (g/cc) | $T_m$ (° C.) | Heat of Fusion (J/g) | % Cryst. | $T_c$ (° C.) |
|---|---|---|---|---|---|---|
| 1 | 2.0 | 0.940 | 117.6 | 114.2 | 39.1 | 105.6 |
| 2 | 12.4 | 0.931 | 111.2 | 134.4 | 46.0 | 99.5 |
| 3 | 0.72 | 0.929 | 109.7 | 127.8 | 43.8 | 98.0 |
| C-1 | 1.9 | 0.922 | 110.1 | 146.0 | 50.0 | 98.1 |
| C-2 | 11.7 | 0.918 | 106.0 | 137.6 | 47.1 | 94.4 |
| C-3 | 0.68 | 0.927 | 114.8 | 157.4 | 53.9 | 104.2 |

Table 5D reports the MI and density (for reference) and the coefficient of friction (COF). These results show that the inventive samples have COF values lower than that of the Comparative Examples; the high MI sample (12.4) showed results comparable to that of the comparative LDPE. Low COF is especially important for films, where a lower COF can be critical for films easily being transported across surfaces or across other films. This can also be important for stacking of films. Low COF can be accomplished by the addition of additives to film; however, migration of these additives often occurs so that with time the COF changes. Because the COF control agent, in this case a polysiloxane, is part of the polymer, such migration cannot occur and the COF is expected to be stable with time.

TABLE 5D

Properties of PE-graft-PDMS Polymers and Three Comparative LDPE Polymers

| Sample | MI ($I_2$) (g/10 min) | Density (g/cc) | COF (Kinetic) | COF (Static) |
|---|---|---|---|---|
| 1 | 2.0 | 0.940 | 0.15 | 0.18 |
| 2 | 12.4 | 0.931 | 0.15 | 0.17 |
| 3 | 0.72 | 0.929 | 0.16 | 0.19 |
| C-1 | 1.9 | 0.922 | 0.18 | 0.21 |
| C-2 | 11.7 | 0.918 | 0.18 | 0.21 |
| C-3 | 0.68 | 0.927 | 0.16 | 0.19 |

Short Chain Branching

All values are in branches per 1000 total carbons except as noted in Table 6. Branching values for grafted samples are calculated based on total observed carbons, including those of the grafted polymer (PDMS) and based on the LDPE carbons only. C3 (propyl) branches are not observed in any of the samples.

TABLE 6

Short Chain Branching of Samples and Comparative Samples

| Sample | CI | C5 (amyl) | | | C6+ |
|---|---|---|---|---|---|
| 3 (per 1000 LDPE carbons) | 0 | 1.94 | +/− | 0.19 | 2.70 |
| 2 (per 1000 LDPE carbons) | 0 | 1.92 | +/− | 0.19 | 2.87 |
| 1 (per 1000 LDPE carbons) | 0 | 1.16 | +/− | 0.12 | 1.66 |
| 3 (per 1000 total carbons) | 0.39 | 1.82 | +/− | 0.18 | 2.54 |
| 2 (per 1000 total carbons) | 0.48 | 1.80 | +/− | 0.18 | 2.70 |
| 1 (per 1000 total carbons) | 0.08 | 1.01 | +/− | 0.10 | 1.44 |
| C-1 | 3.45 | 1.71 | +/− | 0.17 | 3.03 |
| C-2 | 0 | 2.41 | +/− | 0.24 | 3.52 |
| C-3 | 0 | 1.67 | +/− | 0.17 | 2.39 |

Dynamic Mechanical Spectroscopy (DMS)

Resin is compression-molded into a 3 mm thick×1 inch circular plaque at 350° F. (177° C.) for 5 minutes under 1500 psi pressure in air. The sample is then taken out of the press and placed on the counter to cool.

Melt rheology, constant temperature frequency sweeps, are performed using a TA Instruments "Advanced Rheometric Expansion System (ARES)," equipped with 25 mm parallel plates, under a nitrogen purge. The sample is placed on the plate and allowed to melt for five minutes at 190° C. The plates are then closed to 2 mm, the sample trimmed, and then the test is started. The method has an additional five minute delay built in, to allow for temperature equilibrium. The experiments are performed at 190° C. over a frequency range of 0.1 to 100 rad/s. The strain amplitude is constant at 10%. The stress response is analyzed in terms of amplitude and phase, from which the storage modulus (G'), loss modulus (G"), dynamic viscosity η*, and tan(δ) are calculated.

Table 7 shows the frequency and viscosity data as measured by dynamic mechanical spectroscopy of the Inventive Examples and Comparative Examples. At comparable melt index, the viscosities of the Inventive Examples in general show increased shear sensitivity or processability as evidenced by decreasing viscosity with increasing frequency as evidenced by the higher viscosity at 190° C. and at 0.1 rad/s divided by the viscosity at 190° C. and at 100 rad/s (Viscosity Ratio) as compared to the Comparative Examples. For example, Example 1 has a Viscosity Ratio of 25 as compared to a Viscosity Ratio of 15 for Example 1. Example 2 has a Viscosity Ratio of 7 and Comparative Example 2 has a Viscosity Ratio of 6. Example 3 and Comparative Example 3 had similar Viscosity Ratios of 26.

TABLE 7

Frequency and Viscosity DMS Data

| Frequency (rad/s) | Viscosity in Pa-s Example 1 | Example 2 | Example 3 | C-1 | C-2 | C-3 |
|---|---|---|---|---|---|---|
| 0.100 | 12,075 | 1,596 | 13,222 | 7,137 | 1,280 | 18,924 |
| 0.158 | 10,531 | 1,546 | 11,557 | 6,648 | 1,258 | 16,605 |
| 0.251 | 9,026 | 1,471 | 9,919 | 6,078 | 1,214 | 14,329 |
| 0.398 | 7,625 | 1,379 | 8,387 | 5,452 | 1,154 | 12,150 |
| 0.631 | 6,359 | 1,273 | 6,988 | 4,803 | 1,078 | 10,167 |
| 1.000 | 5,250 | 1,159 | 5,753 | 4,163 | 992 | 8,401 |
| 1.585 | 4,291 | 1,039 | 4,683 | 3,549 | 899 | 6,855 |
| 2.512 | 3,471 | 915 | 3,774 | 2,981 | 803 | 5,533 |
| 3.981 | 2,784 | 795 | 3,014 | 2,469 | 708 | 4,435 |
| 6.310 | 2,216 | 682 | 2,386 | 2,019 | 616 | 3,509 |
| 10.000 | 1,751 | 576 | 1,875 | 1,632 | 530 | 2,751 |
| 15.849 | 1,373 | 482 | 1,463 | 1,304 | 450 | 2,141 |
| 25.119 | 1,070 | 399 | 1,133 | 1,032 | 378 | 1,651 |
| 39.811 | 829 | 326 | 872 | 809 | 315 | 1,263 |
| 63.096 | 638 | 266 | 668 | 629 | 259 | 959 |
| 100.000 | 489 | 213 | 508 | 485 | 211 | 718 |
| Viscosity at 0.1 rad/s (Pa-s) | 12,075 | 1,596 | 13,222 | 7,137 | 1,280 | 18,924 |
| Viscosity at 100 rad/s (Pa-s) | 489 | 213 | 508 | 485 | 211 | 718 |
| Viscosoity Ratio | 25 | 7 | 26 | 15 | 6 | 26 |

Although the invention has been described with certain detail through the preceding description of the preferred embodiments, this detail is for the primary purpose of illustration. Many variations and modifications can be made by one skilled in the art without departing from the spirit and scope of the invention as described in the following claims.

We claim:

1. A polymer comprising units derived from ethylene and siloxane, the polymer having at least 0.15 units of amyl groups per 1000 carbon atoms as determined by $^{13}$C Nuclear Magnetic Resonance (NMR).

2. The polymer of claim 1 comprising a portion of the ethylene bonded to one or more silicon atoms of the siloxane.

3. The polymer of claim 1 wherein the polymer comprises at least one ethylene-based polymeric branch bonded to a silicon atom of the siloxane.

4. The polymer of claim 1 having a peak melting temperature Tm in ° C. and density in g/cm$^3$ that satisfies the mathematical relationship:

$$Tm < 771.5(° C.·cm^3)(density) - 604(° C.).$$

5. The polymer of claim 1 having a density of at least 0.93 g/cm$^3$.

6. The polymer of claim 1 in which less than 40 weight percent of the siloxane is extractable by solvent extraction.

7. The polymer of claim 1 having an $I_{10}/I_2$ ratio of at least 13, wherein $I_2$ is the melt index of the polymer measured in accordance with ASTM D 1238, Condition 190° C./2.16 kg, in grams eluted per 10 minutes, and $I_{10}$ is the melt index of the polymer measured in accordance with ASTM D 1238, Condition 190° C./10 kg, in grams eluted per 10 minutes.

8. The polymer of claim 1 having an $I_2$ of less than 5, wherein $I_2$ is the melt index of the polymer measured in accordance with ASTM D 1238, Condition 190° C./2.16 kg, and is reported in grams eluted per 10 minutes.

9. The polymer of claim 1 having a heat of fusion ($H_f$) in Joules/grams (J/g) and density in g/cm³ that satisfies the mathematical relationship:

$$H_f < 2333 \text{ (J·cm}^3\text{/g}^2\text{)} \times \text{(density)} - 2009 \text{ (J/g)}.$$

10. A composition comprising the polymer of claim 1.

11. An article comprising at least one component formed from the composition of claim 10.

12. The article of claim 11 in the form of a film.

13. A process to form the polymer of claim 1 comprising units derived from ethylene and siloxane, the process comprising:

A. Contacting at least one siloxane with ethylene in the presence of a free-radical initiator in a first reactor or a first part of a multi-part reactor; and B. Reacting the siloxane with additional ethylene in the presence fo the free-radical initiator to form an ethylene-based polymeric branch bonded to the siloxane in at least one other reactor or a later part of a multi-part reactor.

14. The process of claim 13 in which the ethylene-based polymeric branch is formed by an ethylene monomer bonding with the siloxane to form an ethylene-siloxane moiety, and the resulting moiety polymerizing with at least additional ethylene monomer to form the ethylene-based polymeric branch.

15. The process of claim 13 in which the ethylene-based polymeric branch is formed independently of the siloxane and is then grafted to the siloxane.

* * * * *